US005661503A

United States Patent [19]

Terai

[11] Patent Number: 5,661,503

[45] Date of Patent: Aug. 26, 1997

[54] POLYCRYSTALLINE SILICON-BASED SUBSTRATE FOR LIQUID JET RECORDING HEAD, PROCESS FOR PRODUCING SAID SUBSTRATE, LIQUID JET RECORDING HEAD IN WHICH SAID SUBSTRATE IS USED, AND LIQUID JET RECORDING APPARATUS IN WHICH SAID SUBSTRATE IS USED

[75] Inventor: Haruhiko Terai, Yokohama, Japan

[73] Assignee: Canon Kabushiki Kaisha, Tokyo, Japan

[21] Appl. No.: 78,267

[22] PCT Filed: Nov. 6, 1992

[86] PCT No.: PCT/JP92/01434

§ 371 Date: Oct. 25, 1993

§ 102(e) Date: Oct. 25, 1993

[87] PCT Pub. No.: WO93/08989

PCT Pub. Date: May 13, 1993

[30] Foreign Application Priority Data

Nov. 6, 1991 [JP] Japan .................................... 3-290086

[51] Int. Cl.$^6$ ...................................................... G01D 15/18

[52] U.S. Cl. ............................... 347/63; 438/21; 438/762

[58] Field of Search ............................... 347/63; 437/247, 437/952, 968, 980

[56] References Cited

U.S. PATENT DOCUMENTS

| | | | |
|---|---|---|---|
| 4,336,548 | 6/1982 | Matsumoto | 347/63 |
| 4,432,035 | 2/1984 | Hsiegn et al. | 361/322 |
| 4,535,343 | 8/1985 | Wright et al. | 347/64 |
| 4,551,907 | 11/1985 | Mukai | 437/968 |
| 5,103,246 | 4/1992 | Dunn | 347/63 |
| 5,469,200 | 11/1995 | Terai | 347/63 |

FOREIGN PATENT DOCUMENTS

| | | |
|---|---|---|
| 59-22435 | 12/1984 | Japan . |
| 0112086 | 5/1989 | Japan . |
| 0322763 | 10/1991 | Japan . |

*Primary Examiner*—Valerie Lund

*Attorney, Agent, or Firm*—Fitzpatrick, Cella, Harper & Scinto

[57] ABSTRACT

A substrate for liquid jet recording head including an electrothermal converting body comprising a heat generating resistor capable of generating thermal energy and a pair of wirings electrically connected to said heat generating resistor, characterized in that said substrate includes a base member constituted by a polycrystalline material such as a polycrystalline silicon material or the like, a process for producing this substrate, a liquid jet recording head in which said substrate, and a liquid jet recording apparatus in which said recording head is used.

A desirable recording head which is free of a warpage or a curved portion and which provides a high quality recorded image can be produced by using said base member. Further, a desirable recording apparatus which enables to record a high quality image at a high recording speed. In the process of producing said substrate, the surface of the polycrystalline base member is thermally oxidized to provide a surface excelling in flatness.

21 Claims, 8 Drawing Sheets

POLYCRYSTALLINE SILICON-BASED SUBSTRATE FOR LIQUID JET RECORDING HEAD, PROCESS FOR PRODUCING SAID SUBSTRATE, LIQUID JET RECORDING HEAD IN WHICH SAID SUBSTRATE IS USED, AND LIQUID JET RECORDING APPARATUS IN WHICH SAID SUBSTRATE IS USED

FIELD OF THE INVENTION

The present invention relates to a polycrystalline silicon-based substrate for use in a liquid jet recording head of conducting recording by discharging a liquid recording medium through discharging outlets utilizing thermal energy, and a process for producing said substrate. The present invention also relates to a liquid jet recording head in which said substrate is used and a liquid jet recording apparatus in which said substrate is used.

BACKGROUND OF THE INVENTION

There is known a liquid jet recording method for conducting recording by discharging a liquid recording medium such as ink through discharging outlets utilizing thermal energy to sputter said liquid recording medium whereby said liquid recording medium is deposited on a recording member such as papers, plastic sheets, fabrics, or the like. The liquid jet recording method is of a so-called non-impact recording method, and it has various advantages in that the noise at the recording can be reduced to a negligible order, there is not a particular restriction for the recording member used, and color recording can be relatively easily attained. And as for the apparatus, that is, the liquid jet recording apparatus, for practicing the above liquid jet recording method, there are advantages in that the structure thereof can be relatively simplified, liquid discharging nozzles can be arranged at a high density, and a high speed recording can be relatively easily attained. In view of this, the liquid jet recording method has recently received the public attention, and various studies have been made thereon. Incidentally, a number of liquid jet recording apparatus have been put on the market.

Shown in FIG. 5(A) is a schematic cross-eyed view illustrating the principal part of an example of a recording head used in such liquid jet recording apparatus. FIG. 5(B) is a schematic cross-sectional view taken along the liquid pathway and at the face perpendicular to the substrate of the recording head shown in FIG. 5(A).

As apparent from FIG. 5(A) and FIG. 5(B), the recording head is provided with a substrate 8 for liquid jet recording head comprising a plurality of discharging outlets 7 each serving to discharge a liquid recording medium such as ink, liquid pathways 6 each corresponding one of the discharging outlets 7, a liquid chamber 10 serving to supply a liquid recording medium to each of the liquid pathways, heat generating resistors **2*a* each serving to supply thermal energy to the liquid recording medium, and wirings 3*a*, 3*b* for applying an electric signal to the heat generating resistors 2*a***.

The substrate for liquid jet recording head 8 of the configuration shown in FIG. 5(B) in that a heat generating resistor layer 2 is disposed on a base member 1, a wiring layer 3 constituted by a material having a good electroconductivity is laminated on said heat generating resistor layer 2, and a portion **2*a* of the heat generation resistor layer where the wiring layer 3** is not disposed functions as a heat generating resistor.

In this configuration, when an electric signal is applied to the heat generating resistor **2*a* through the wirings 3*a*, 3*b*, the heat generating resistor 2*a* is energized. The substrate for liquid jet recording head 8 may be provided with a protective layer 4 for the purpose of protecting the wirings 3*a*, 3*b* and the heat generating resistor 2*a*. The protective layer 4 serves to prevent occurrence of electric corrosion or/and electric breakdown at the heat generating resistor 2*a* and the wirings 3*a*, 3*b***.

As the base member 1 of the substrate for liquid jet recording head 8, there can be mentioned plate-like members of silicon, glass, ceramics, or the like. However, in general, a single crystal silicon plate is used as the base member. The reason for this is due to the following situation. That is, in the case where a glass plate is used as the base member 1, there are disadvantages in that the glass plate is poor in thermal conductivity, and when the energization frequency (the drive pulse in other words) of the heat generating resistor **2*a* is increased, there is a fear that the heat generated by the heat generating resistor is excessively accumulated within the base member 1** and as a result, ink in the liquid jet recording head is heated by virtue of the heat accumulated to cause bubbles, resulting in providing defects in the ink discharging performance.

In the case where a ceramic plate is used as the base member 1, there are advantages such that the size of the substrate can be enlarged to a certain extent, and a ceramic plate having a larger thermal conductivity than that of the glass plate can be selectively used. However, even in the case of using such a ceramic plate, there are disadvantages such that the ceramic plate is usually accompanied by surface defects such as pinholes or minute protrusions of some microns to some tens microns in size because it is produced by baking powdery raw materials, and such surface defects are liable to short-circuit or disconnect the wirings, wherein a desirable yield is hardly provided. There are further disadvantages in this case such that the ceramic plate is usually of a surface roughness of Ra (center line mean roughness)=about 0.15 μm, and because of this, it is difficult to provide a surface roughness optimum for forming a desirable heat generating resistor layer 2 excelling in durability thereon; specifically in the case of preparing a liquid jet recording head using a plate made of alumina ceramics, because of the above reasons, a removal is often occurred between the base member 1 and the heat generating resistor layer 2 or a cavitation is often occurred at a part of the heat generating resistor layer formed on the defective surface of the base member when the bubbles generated are extinguished, resulting in disconnecting the heat generating resistor layer, wherein the performance of the heat generating resistor layer is eventually deteriorated.

In order to eliminate these problems in the case of using the ceramic base member 1, there is a proposal of grinding such roughened surface of the ceramic base member to smooth said surface whereby improving the adhesion between the base member 1 and the heat generating resistor layer 2 and preventing occurrence of the premature disconnection of the heat generating resistor layer which will be cased because of cavitations centralized at a part of the heat generating resistor layer. However, this proposal is poor in practicability since the alumina ceramics are of a high hardness and because of this, their surface roughness is hardly adjusted as desired.

Other than this proposal, there is another proposal in order to eliminate the above problems in that a glaze layer (a welded glassy component layer) is formed on the surface of such ceramic base member to thereby provide an alumina glaze base member. However, it is almost impossible to form the glaze layer at a thickness of less than a thickness of 40 to 50 μm by the manner employable in the formation of a glaze layer. As well as in the case of using the glass base member, problems relating to occurrence of excessive accumulation of heat are liable to occur also in this case. Therefore, this proposal is also poor in practicability.

In the case of using silicon plates as the base member 1, the above described problems relating to occurrence of excessive accumulation of heat are not occurred. Especially, in the case of using a single crystal silicon wafer as the base member, since the single crystal silicon wafer excels in surface property, there is no fear that the foregoing problems relating to disconnection of the wirings and the like are occurred. For this, for example, Japanese Unexamined Patent Publication No. 125741/1990 describes a substrate for the foregoing liquid jet recording head utilizing thermal energy, in which a single crystal silicon wafer is used.

Incidentally, in recent years, in the field of recording using the liquid jet recording method, there has been an increased societal demand for early provision of a recording apparatus capable of obtaining a high quality record image at an improved speed. In order to enable to conduct recording on a wide recording member in reply to such societal demand for high speed recording, various studies have been made of a large-sized recording head, i.e., a so-called full-line recording head having a widened discharging width corresponding to the large width of a recording member.

The results of the studies have revealed that the use a single crystal silicon wafer is optimum as the base member as long as the recording head to be prepared is of a relatively small size, but the use of a single crystal silicon wafer in the case of obtaining a large-sized recording head entails such problems as will be described below. Because of this, there are subjects necessary to be solved in order for the single crystal silicon wafer to be usable in a substrate for the large-sized recording head.

That is, in the case where a substrate for liquid jet recording head is prepared using a base member comprising a single crystal silicon material, the single crystal base member, i.e., a single crystal silicon wafer is usually obtained by quarrying a single crystal silicon ingot produced by the pull method. The single crystal ingot which can be presently produced by the pull method is a rod-like shaped one of 8 inches in diameter and about 1 m in length at the maximum. Therefore, there is eventually a limit for the size of a single crystal silicon wafer which can be quarried from the single crystal ingot. However, it is possible to quarry a single crystal silicon wafer having an enlarged size from the single crystal ingot. In this case, problems are, however, entailed in that the utilization efficiency is greatly reduced, resulting in unavoidably raising the cost of the resulting single crystal wafer, and this leads to raising the production cost of a final product.

In the substrate for liquid jet recording head, in order to facilitate thermal energy to transmit to the liquid recording medium, there is usually disposed, on the surface of the base member, a heat accumulating layer (a lower layer in other words) capable of attaining a desirable balance between the heat accumulating property and the heat radiating property. In this case, the substrate is obtained in a manner that a single crystal silicon wafer is obtained by quarrying the above described single crystal ingot, the surface of the single crystal silicon wafer obtained is subjected to thermal oxidation to form a $SiO_2$ layer as the heat accumulating layer, the foregoing heat generating resistor layer and the foregoing wirings are successively formed, and the resultant is cut into a plurality of pieces each capable of serving as a base member for a substrate for recording head.

In the viewpoint of obtaining a large-sized recording head, the present inventor examined these members obtained in the above manner. As a result, there was obtained a finding that some of them, which were quarried from the opposite end portions of the single crystal silicon wafer, are deformed in such a bow-shaped form as shown in FIG. 9(A). And their deformed magnitude was found to be ranging in the range of 60 to 90 μm. As for these deformed members, it was found that they are apt to break when their deformation is forcibly corrected. And as for some of the base members which are slight in deformation, it was found that there are still problems such that uniform grinding is sometimes hardly attained in the successive grinding step after the quarrying step, precise pattering sometimes cannot be conducted in the step of patterning wirings on the base member, and sometimes, it is difficult to precisely electrically connect the wirings arranged on the base member to an IC or the like.

It was also found that in the case where a liquid jet recording head should be obtained using such deformed base member, the liquid jet recording head unavoidably causes a positional shift of a liquid recording medium to a recording member on which recording is to be performed due to the dustortion of the base member, resulting in providing defects such as missing dots or/and uneven dots for an image recorded.

It is a matter of course that in the case where the end portions of the single crystal silicon wafer which are apt to cause the foregoing deformation are not used as a base member for a substrate for liquid jet recording head, the production cost for the substrate for liquid jet recording head unavoidably becomes very expensive.

The present inventor made studies of the reason why the base member is deformed as above described. As a result, it was found that in the case of the base memmber not having the foregoing thermal oxide layer thereon as the heat accumulating layer, such deformation is hardly occurred, and thus, the occurrence of such deformation is due to the thermal oxidation process upon forming the foregoing heat accumulating layer. And there were obtained findings that since after the single crystal silicon wafer having been subjected to thermal oxidization, it is cooled wherein the end portions of the single crystal silicon wafer, particularly four corners thereof, are cooled for the first time, tensile stresses are caused at the periphery in a state as expressed by arrow marks in FIG. 8(A) and those stresses then become distributed into the inside of the substrate in a state as expressed by (+) marks in FIG. 8(B) and that when this single crystal silicon wafer is cut in order to obtain a substrate for liquid jet recording head, part of those stresses is released to make the substrate deformed in such a state as above described.

On the basis of the above findings, it was found that there is an inherent limit for the single crystal silicon wafer to be used as the base member for a substrate for liquid jet recording head in order to attain elongation of the substrate. Therefore, in order to obtain an elongated liquid jet recording head capable of attaining high speed recording, it is necessary to integrate a plurality of relatively short substrates for recording head. However, it is extremely difficult to adjust each of the joint portions among such substrates so that no negative influence is provided to an image recorded.

Thus, it is an earnest desire to provide an inexpensive substrate for liquid jet recording head which can be effectively produced without having any restriction for its form depending upon the production process and without occurrence of problems relating to deformation and the like and which enables to easily attain high speed recording.

SUMMARY OF THE INVENTION

The principal object of the present invention is to solve the foregoing problems of the conventional substrate for liquid jet recording head and to provide a substrate comprising a specific material for liquid jet recording head which enables to obtain an elongated recording head.

Another object of the present invention is to provide an elongated substrate for liquid jet recording head in which an elongated base member composed of a polycrystalline silicon material is used.

A further object of the present invention is to provide a large-sized liquid jet recording head which can be effectively produced without integrating a plurality of substrates as in the case of using a single crystal silicon wafer and without the foregoing problems relating to occurrence of deformation of a substrate and occurrence of a reduction in quality of an image recorded due to the deformed substrate which are found in the case of using a single crystal silicon wafer.

A further object of the present invention is to provide a liquid jet recording apparatus provided with the above liquid jet recording head which enables to attain high speed recording of providing a high quality recorded image.

A further object of the present invention is to provide a process for producing a substrate for liquid jet recording head, which includes the step of forming a thermal oxide layer having a good surface property on the surface of a base member comprising a polycrystalline silicon material which is used in the above-described substrate for liquid jet recording head.

In order to solve the foregoing problems of the conventional substrate for liquid jet recording head and in order to attain the above objects, The present inventor made studies through experiments which will be later described. As a result, the present inventor obtained the following findings. That is, in the case of using a polycrystalline silicon material as the base member for a substrate for liquid jet recording head, (i) the foregoing problems in the case of using a single crystal silicon wafer which are related to the restriction for the size of a substrate and to the occurrence of deformation of the substrate can be effectively solved, and a liquid jet recording head capable of providing a high quality recorded image at a high speed can be effectively produced at a reduced production cost; and (ii) in the case of forming a thermal oxide layer on the polycrystalline silicon base member, when a barrier layer serving to control the diffusion of oxygen is firstly formed on the polycrystalline silicon base member and the resultant is followed by thermal oxidation, the amount of oxygen to be diffused into the base member can be properly controlled, and a a result, the resulting thermal oxide later becomes to have an excellent surface property.

The present invention has been accomplished based on the findings obtained through the experiments by the present inventor.

The present invention includes a substrate for liquid jet recording head of the configuration which will be described below, a liquid jet recording head in which said substrate is used, a liquid jet recording apparatus in which said substrate is used, and a process for producing said substrate.

The present invention provides a substrate for liquid jet recording head including an electrothermal converting body comprising a heat generating resistor capable of generating thermal energy and a pair of wiring electrically connected to said heat generating resistor, wherein the base member constituting said substrate is composed of a polycrystalline silicon material. The base member may have a surface at least a part of which being thermally oxidized.

The substrate for liquid jet recording head according to the present invention have various advantages in that even if the substrate is of a greatly prolonged length, it can be effectively produced at a lower production cost in comparison with the foregoing case wherein a single crystal silicon wafer is used; no deformation is occurred not only in the case where the substrate is in the form of a normal shape but also in the case where the substrate is in the form of an elongated shape; and highly precise wire-patterning can be easily attained.

The present invention provides a liquid jet recording head including: a liquid discharging outlet; a substrate for liquid jet recording head including an electrothermal converting body comprising a heat generating resistor capable of generating thermal energy for discharging liquid from said discharging outlet and a pair of wirings electrically connected to said heat generating resistor, said pair of wirings being capable of supplying an electric signal for generating said thermal energy to said heat generating body; and a liquid supplying pathway disposed in the vicinity of said electrothermal converting body of said substrate, wherein said substrate includes a base member is composed of a polycrystalline silicon material.

The liquid jet recording head according to the present invention is markedly advantageous in that a desired elongation therefor can be easily attained. Particularly, the elongation of a liquid jet recording head in the case of using a single crystal silicon wafer can be attained for the first time by integrating a plurality of substrates for liquid jet recording head. However, in the present invention, such integration process is not necessary to be carried out.

Thus, the elongated liquid jet recording head according to the present invention is free of the problems relating to occurrence of unevenness as for images recorded which are caused due to the integration of a plurality of substrates for liquid jet recording head in the case of an elongated liquid jet recording head in which a single crystal silicon wafer is used. Other than this advantage, the liquid jet recording head according to the present invention has further advantages. That is, since the substrate excels in surface property, the liquid jet recording head can be produced at a high yield, and since the positional precision for a liquid recording medium discharged from the discharging outlets to be deposited on a recording member is always insured, there is stably and continuously provided a high quality recorded image.

The present invention provides a liquid jet recording apparatus comprising: a liquid jet recording head including a liquid discharging outlet; a substrate for liquid jet recording head including an electrothermal converting body comprising a heat generating resistor capable of generating thermal energy for discharging liquid from said discharging outlet and a pair of wirings electrically connected to said heat generating resistor, said pair of wirings being capable of supplying an electric signal for generating said thermal energy to said heat generating body; a liquid supplying pathway disposed in the vicinity of said electrothermal converting body of said substrate; and an electric signal supplying means capable of supplying an electric signal to said heat generating resistor of said recording head, wherein said substrate includes a base member composed of a polycrystalline silicon material.

The liquid jet recording head according to the present invention enables to conduct high speed recording wherein a high quality recorded image is stably and repeatedly provided.

The present invention provides a process for producing a substrate for liquid jet recording head in which an electrothermal converting body comprising a heat generating resistor and a pair of wirings electrically connected to said heat generating resistor is disposed on an oxide layer formed on a base member, said process is characterized by including the steps of using a polycrystalline silicon member as said base member, forming a barrier layer capable of controlling oxygen gas to be diffused on the surface of said polycrystalline silicon member, and subjecting the resultant to thermal oxidation to thereby form an oxide layer on said polycrystalline silicon member.

According to the process for producing a substrate for liquid jet recording head of the present invention, although a polycrystalline silicon material inherently having an irregular surface is used as the base member, it makes it possible to form a desirable thermal oxide layer with a surface excelling in flatness. The thermal oxide layer obtained excels in durability, and thus, breakdown is hardly occurred for the wirings and the like which are disposed on the base member. Hence, a highly reliable substrate for liquid jet recording head can be effectively produced.

Experiments

In the field of solar cell, a plate-like polycrystalline member has been used. However, in the case of using such polycrystalline silicon member in a substrate for liquid jet recording head, it is required to have a flat surface in a desirable state for the reason that precise wirings and the like are disposed thereon. However, The polycrystalline silicon member, being different from a single crystal member, contains various crystals with a different orientation, and because of this, it has an irregular surface. In view of this, it is a common recognition in the field of liquid jet recording head that a desirable flatness which is required for the base member for a substrate for liquid jet recording head is hardly attained for the surface of the polycrystalline silicon member even by means of the polishing technique capable of providing a mirror-ground surface. Hence, a polycrystalline silicon member has never tried to use as the base member in the field of liquid jet recording head.

Disregarding this common recognition, the present inventor tried to use a polycrystalline silicon material as the base member for a substrate for liquid jet recording head as described in the following experiments. As described in the following, based on the findings obtained in the experiments, there was obtained a finding that a polycrystalline silicon material can be effectively used as the base member for a substrate for liquid jet recording head.

Description will be made of the experiments conducted by the present inventor.

Experiment A

In the case of producing a semiconductor device using a conventional single crystal wafer, the mechanochemical polishing technique is employed in order to minimize work defect zones present on the single crystal wafer. In the mechanochemical polishing technique, an abrasive material comprising a colloidal silica added with various alkalies such as NaOH, KOH, organic amines, and the like is used in the primary polishing, and an abrasive material comprising a colloidal silica added with ammonia is used in the secondary polishing.

However, when the surface of a polycrystalline silicon member is processed by the above polishing technique, steps are usually occurred at the surface. The present inventor presumed that this occurrence would be caused due to the difference in the amount of the silicon material to be etched by the alkali component of the abrasive material depending upon the crystal orientation.

The following experiment was conducted based on this presumption.

Firstly, there were prepared a plurality of single crystal base member samples in the following manner. That is, a single crystal silicon ingot (8 inch×110 cm) of a boron dopant p-type was prepared by pulverizing a high purity polycrystal rod with a residual impurity content of less than 1 ppb obtained by way of the precipitation reaction through hydrogen reduction and pyrolysis of $SiHCl_3$, fusing the resultant, and pulling the fused material toward the (111) direction by a conventional CZ method. The single crystal ingot obtained was then formed into a prismatic shape by means of a grinder. The resultant was quarried by means of a multi-wire saw, to thereby obtain a plurality of plate members. Each of the plate members obtained was subjected to lapping treatment to remove an about 30 μm thick surface portion whereby obtaining a plate member with a flat surface.

Separately, there were prepared a plurality of polycrystalline silicon base member samples in the following manner. That is, there was provided a high purity polycrystalline silicon material, obtained in accordance with the same precipitation reaction through hydrogen reduction and pyrolysis as in the above case of obtaining the foregoing single crystal silicon material. The material obtained was then pulverized, the resultant was fused in a quartz crucible at 1420° C., the fused material was poured into a casting mold made of graphite, followed by cooling, whereby an ingot of 40 cm in square size was obtained. The ingot obtained was quarried by means of a multi-wire saw to thereby obtain a plurality of plate members. Each of the plate members obtained was subjected to lapping treatment to remove an about 30 μm thick surface portion whereby obtaining a plate member having a flat surface.

In this way, as for each of the single crystal material and the polycrystalline silicon material, there were obtained a plurality of samples each having a size of 300 (mm)×150 (mm)×1.1 (mm) (for the simplification purpose, this will be abbreviated as "300×150×1.1 (mm)") as shown in Table 1.

In the following, there was used a single side polishing machine, produced by Speedfarm Kabushiki Kaisha, in the polishing processing.

For each sample, the primary polishing and the secondary polishing were separately conducted under the below-described respective conditions. The surface finishing efficiency in relation to the presence or absence of alkali upon the polishing was evaluated. The evaluated results obtained are collectively shown in Table 1.

The conditions in the primary polishing: abrasive fabric: polyurethane-impregnated polyester non-woven fabric; abrasive material: colloidal silica (0.06 μm in particle size); polishing pressure: 250 g/$cm^2$; polishing temperature: 42° C.; processing speed: 0.7 μm/min.

The conditions in the secondary polishing: abrasive fabric: suede type urethane foam; abrasive material: silica fine powder (0.01 μm in particle size); polishing pressure: 175 g/$cm^2$; polishing temperature: 32° C.; processing speed: 0.2 μm/min.

From the results shown in Table 1, it was found that even in the case of a polycrystalline silicon base member, it is possible to attain a surface flatness similar to that obtained in the case of a single crystal silicon member by omitting the addition of alkali upon the polishing, and a polycrystalline silicon member can be used as the base member for a substrate for liquid jet recording head.

Experiment B

In this experiment, discussion was made of a difference between the magnitude of a single crystal silicon base member to be deformed and that of a polycrystalline silicon base member to be deformed.

The single crystal silicon base member sample was prepared in the following manner. That is, a single crystal ingot (8 inch×110 cm) of a boron dopant p-type was prepared by pulverizing a high purity polycrystal rod with a residual impurity content of less than 1 ppb obtained by way of the precipitation reaction through hydrogen reduction and pyrolysis of $SiHCl_3$, fusing the resultant, and pulling the fused material toward the (111) direction by a conventional CZ method. The single crystal ingot was formed into a prismatic shape by means of a grinder. The resultant was quarried by means of a multi-wire saw to obtain a plate member. The plate member obtained was subjected to lapping treatment to remove an about 30 μm thick surface portion whereby obtaining a plate member having a flat surface. The end portions of the resultant were chanferred by means of a beveling machine, followed by finishing by way of the polish processing, to thereby obtain a mirror-ground member with a surface roughness of Rmax 150 Å.

Then, the surface of the mirror-ground member was subjected to thermal oxidation by way of the pyrogenic oxidation method (the hydrogen burning oxidation method) shown in FIG. 7. The thermal oxidation in this case is conducted, for example, in the following manner. That is, hydrogen gas and oxygen gas are separately introduced into a quartz tube 73, wherein these gases are reacted with each other to produce $H_2O$, and the unreacted residuals are burned. The mirror-ground member as an object 71 to be treated is arranged in the quartz tube 73, and the object is heated to a desired temperature by an electric furnace 74.

The thermal oxidation of the surface of the mirror-ground member using the oxidation apparatus was conducted under the conditions of 1 atm for the gas pressure, 1150° C. for the treating temperature, and 14 hours for the treating period of time, while introducing hydrogen gas and oxygen gas into the quartz tube, whereby a 3μm thick thermal oxide layer was formed on said member.

In this way, there were prepared five single crystal silicon base member samples each having a different size as shown in Table 2.

Separately, there were prepared a plurality of polycrystalline silicon base member samples in the following manner. That is, there was firstly provided a high purity polycrystalline silicon material, obtained in accordance with the same precipitation reaction through hydrogen reduction and pyrolysis as in the above case of obtaining the foregoing single crystal silicon material. The material obtained was then pulverized, the resultant was fused in a quartz crucible at 1420° C., the fused material was poured into a casting mold made of graphite, followed by cooling, whereby an ingot of 120 cm in square size was obtained. In this case, the higher the cooling speed is, the smaller the crystal grain size is, and because of this, the crystal grain size in the vicinity of the center becomes greater. In view of this, the portion of the ingot obtained having a mean grain size of 2 mm was quarried by means of a multi-wire saw to obtain a polycrystalline silicon plate member. The plate member obtained was subjected to lapping treatment to remove an about 30 μm thick surface portion whereby obtaining a plate member having a flat surface. The end portions of the resultant were chanferred by means of a beveling machine, followed by finishing by way of the polish processing, to thereby obtain a mirror-ground member with a surface roughness of Rmax 150 Å.

Then, the surface of the mirror-ground member was subjected to thermal oxidation by way of the above described pyrogenic oxidation method under the same conditions employed in the above case, whereby a 3 μm thick thermal oxide layer was formed on said member.

In this way, there were prepared five polycrystalline silicon base member samples each having a different size as shown in Table 2.

As for each of the resultant single crystal silicon base member samples and the resultant polycrystalline base member samples, on the surface thereof, there were laminated an aluminum layer (4500 Å thick) as the wirings, a Hf layer (1500 Å thick) as the heat generating resistor, a Ti later (50 Å) as the contact layer, a $SiO_2$ layer (1.5 μm thick) as the protective layer, a Ta layer (5000 Å thick), and a polyimide film (3 μm thick). Thus, there were obtained a plurality of substrates for liquid jet recording head.

Now, in the production of a liquid jet recording head using a substrate for liquid jet recording head, an about 20 μm thick negative dry film is formed on the substrate, followed by subjecting to exposure for the purpose of patterning liquid pathways. In this patterning process, if the substrate is accompanied by a warp, the focusing position is often deviated to cause a defective exposure.

In this viewpoint, as for each substrate, the magnitude of the warp was evaluated. The evaluation of the warp was conducted by placing the sample on a measuring table and measuring its maximum displacement magnitude by means of a dial gauge of 1 μm in minimum scale.

The results obtained are collectively shown in Table 2. The values shown in Table 2 are values relative to the maximum warp magnitude of the polycrystalline silicon substrate sample of 300×150×1.1 (mm) in size, which was set at 1.

Based on the results shown in Table 2, the followings are understood. That is, the respective warp magnitudes of the polycrystalline silicon substrate samples examined are slight and substantially the same, but as for the warp magnitude of each of the single crystal silicon substrate samples examined, it starts increasing from the single crystal silicon substrate sample of 500×150×1.1 (mm) in size, and the single crystal silicon substrate sample of 800×150×1.1 (mm) in size is great as much as 3 in terms of relative value; in the case of the single crystal silicon substrate sample of 2 in warp magnitude relative value, the focusing position in the exposure process is liable to deviate to cause a defective exposure, and in the case of the single crystal silicon substrate sample of 3 in warp magnitude relative value, the focusing position in the exposure process is definitely deviated to cause a defective exposure; and the single crystal silicon substrate sample of 500×150×1.1 (mm) in size is the usable limit for producing a liquid jet recording head.

Experiment C

In this experiment, as for each of a single crystal silicon base member and a polycrystalline silicon base member, studies were made of the interrelation between the crystal grain size and the occurrence of a deformation at the base member due to warpage.

There were prepared 10 mirror-ground single crystal silicon base member samples each having a size of 300×150 ×1.1 (mm) (Sample No. 1) in the same manner as in Experiment B.

Separately, there were prepared a plurality of mirror-ground polycrystalline silicon base members each having a size of 300×150×1.1 (mm) in the same manner as in Experiment B. Incidentally, the polycrystalline silicon ingot obtained is of a varied crystal grain size which is gradually enlarged from the casting mold side toward the center. In view of this, appropriate portions of the polycrystalline silicon ingot were selected upon the quarrying, to thereby obtain seven polycrystalline silicon plates (Sample Nos. 2 to 8) each having a different mean crystal grain size as shown in the columns Sample No. 2 to Sample No. 8 of Table 3. As for each of these seven plates, there were obtained 10 base member samples. In this case, the mean crystal grain size was measured by a crystal grain size measuring method based on the cutting method described in the description of the ferrite crystal grain size examining method in the JIS G 0552.

As for each of the single crystal silicon base member sample (Sample No. 1) and the polycrystalline silicon base member samples, a 3 μm thick thermal oxide layer was formed in accordance with the pyrogenic oxidation method described in Experiment B.

Now, an elongated integral liquid jet recording head is obtained by cutting the substrate for liquid jet recording head into a plurality of strip forms each being dedicated for a head. In this case, there is a problem in that only the heads cut from the opposite sides of the substrate are always bow-shaped. The situation wherein these bow-shaped heads are caused is shown in FIG. 9(A).

Incidentally, if the face to be polished is warped upon conducting the polishing processing, a problem is entailed in that since the distance between the heat generating resistor and the discharging outlet face is not uniform, a defect is liable to provide for an image recorded. In view of this, for the purpose of examining the process yield in the polishing process, each of the opposite side portions of the base member sample was cut by means of a slicer to thereby obtain two strip-shaped test samples of 10 mm in width. Thus, there were obtained 20 test samples as for each of the samples described in Table 3.

As for each sample, the maximum deformation magnitude was measured by placing it on a precision XY-table. The measuring manner in this case is shown in FIGS. 9(B) to 9(D). In the manner shown in FIG. 9(D), the measurement of the maximum deformation magnitude was conducted by setting the points a and b to the X axis of the XY-table and measuring a deformation magnitude in the Y direction.

As for the results obtained, the sample which was beyond a given allowable deformation magnitude in the polishing process was made to be unfitness, and the fitness proportion was obtained as for each sample. The evaluated results are collectively shown in Table 3, in which the values shown are values relative to the fitness proportion of Sample No. 8 of 0.001 mm in mean crystal grain size, which was set at 1.

Based on the results shown in Table 3, there was obtained a finding that in general, a polycrystalline silicon base member is surpassing a single crystal silicon base member in terms of deformation magnitude due to warpage. Particularly, as for the polycrystalline silicon base member samples of a mean crystal grain size exceeding 8 mm, their superiority to the single crystal silicon base member is not significant; as for the polycrystalline silicon base member samples of a mean crystal grain size in the range of 2 mm to 8 mm, their superiority to the single crystal silicon base member is significant, but they are inferior to the polycrystalline silicon base member samples of a mean crystal grain size of 2 mm or less. From this situation, it is understood that in order for the polycrystalline silicon member base member to be effectively usable, it is desired to be preferably of a mean crystal grain size of 8 mm or less, more preferably of a mean crystal grain size of 2 mm or less.

Experiment D

As for the base member for a substrate for liquid jet recording head, since wirings are disposed thereon, it is required to have a desirably flat surface. Therefore, even in the case where a polycrystalline silicon material is used as the base member, it is required to meet this requirement.

By the way, it is known to use a polycrystalline silicon material as a substrate in the field of solar cell. In this case, as for the surface state of the polycrystalline silicon substrate, there is not such a severer requirement with regard to surface flatness as in the case of the base member for a substrate for liquid jet recording head. In fact, polycrystalline silicon substrates used in the field of solar cell usually contain certain contaminants. A polycrystalline silicon ingot used for obtaining a polycrystalline silicon substrate for a solar cell is prepared by fusing a silicon material in a quartz crucible and cooling the fused silicon material to solidify. The fused silicon material in this case is very chemically reactive and it unavoidably chemically reacts with the constituent quartz of the crucible in a way expressed by the chemical formula $SiO_2+Si—2SiO$. As a result, upon cooling and solidifying the fused silicon material, the silicon is firmly adhered to the inner wall face of the crucible. An when a strain due to the difference between the coefficient of thermal expansion of the silicon material and that of the quartz is provided therein, a crack is liable to occur at the crucible. In order that the ingot formed can be easily taken out from the crucible, a powdery release agent is coated to the inner wall face of the crucible. Therefore, such release agent is unavoidably contaminated into the ingot. The presence of such contaminant in the ingot is not problematic in the case of the substrate for a solar cell. However, in the case of disposing wirings on the surface of a polycrystalline member obtained in accordance with this manner, when the surface of the polycrystalline silicon member is subjected to polishing treatment in order to provide a mirror-ground surface, the contaminants present in the polycrystalline silicon member cause defects at the resulting mirror-ground surface wherein the contaminants are remained at said surface while providing pits or/and protrusions of some tens microns in size. The presence of such defects entails a problem in that when the wirings are patterned by means of a photolithography technique, there are often occurred portions for which a resist is hardly applied or other portions where a resist is accumulated, resulting in causing disconnection, shortcircuit or the like for the wirings. Further, in the case where such defects are present at the position where a heat generating resistor is arranged, there is a fear that cavitation damages are centralized to cause early disconnection for the wirings at the time when bubbles are generated for discharging ink.

In this experiment, in view of this situation, studies were made of the influence of a contaminant contained in a polycrystalline material upon using the polycrystalline silicon material as the base member for a substrate for liquid jet recording head.

Firstly, in accordance with the manner described in Experiment B, a single crystal plate of 330×150×1.1 (mm)

in size was obtained, and it was subjected to lapping treatment and polishing treatment, to thereby obtain a single crystal silicon base member having a mirror-ground surface of Rmax 150 Å in surface roughness. This base member was made to be Sample No. 1.

At this stage, the surface state of this base member (Sample No. 1) was observed using a binary image processing by CCD line sensor system(trademark name: SCANTEC, produced by Nagase Sangyo Kabushiki Kaisha). As a result, it was found that the number of defects per unit area is less than $1/cm^2$ at every measured point in the detectable range with a diameter of more than 1 μm, since no release agent was used in this case. The observed result is shown in Table 4.

Separately, a silicon material was fused in a quartz crucible with no application of a release agent to the inner wall face thereof, and a polycrystalline silicon ingot of 50 cm in square size was obtained. From this ingot, there was obtained a polycrystalline silicon plate of the same size as the above single crystal silicon plate, and it was subjected to lapping treatment and polishing treatment, to thereby obtain a polycrystalline silicon base member having a mirror-ground surface of Rmax 150 Å in surface roughness. This base member was made to be Sample No. 2.

The surface state of this base member was observed in the same manner as in the case of the above single crystal silicon base member. As a result, it was found that the number of defects per unit area is less than $1/cm^2$ at every measured point in the detectable range with a diameter of more than 1 μm, since no release agent was used in this case. The observed result is shown in Table 4.

Then, there were prepared a plurality of base members (Sample Nos. 3 to 6) in the same manner as in the case of preparing Sample No. 2, except for using a release agent. The amount of the release agent used was made different in each case. As for each of the resultant base members (Sample Nos. 3 to 6), the surface state was observed in the same manner as in the case of the above single crystal silicon member (Sample No. 1). As a result, it was found that the base members of Sample Nos. 3 to 6 are respectively of less than $5/cm^2$ less than $10/cm^2$, less than $50/cm^2$, and $100/cm^2$ in terms of the number of defects.

Then, as for each of the above base members (Sample Nos. 1 to 6), the surface thereof was subjected to thermal oxidation treatment in the same manner as in Experiment B, to thereby form a 3 μm thick thermal oxide layer.

In order to examine the situation of causing disconnection or shortcircuit due to the foregoing contaminant, on the thermal oxide layer of each sample, a return wiring pattern of 20 μm in line width and 10 μm in line interval was arranged by way of forming a 4500 Å thick A1 film by a conventional magnetron sputtering technique. In this case, considering the wiring pattern of a liquid jet recording head, as for the return wirings for each sample, there was employed a pattern of 8 mm for the wiring length and 4736 for the number of the wirings. And this pattern was made as a test pattern as for each sample. 20 this patterns were arranged in each sample.

Then, as for each sample, continuity check was conducted by connecting a probe-pin to each wiring terminal. The evaluation of the continuity check was conducted based on the criteria in which the case where neither disconnection nor shortcircuit is present is made to be fitness. The evaluated result was expressed by the number of the patterns with neither disconnection nor shortcircuit among the 20 patterns, specifically, the number of the patterns having been judged as being fitness/the 20 patterns. The results obtained are collectively shown in Table 4.

Based on the results shown in Table 4, the following findings were obtained. That is, (i) the process yield in the case of a polycrystalline silicon member with no release agent is substantially the same as that in the case of a single crystal silicon base member; (ii) the process yield in the case of a polycrystalline silicon member with a release agent and which is of $5/cm^2$ or less in therms of the number of defects of more than 1 μm in diameter is substantially the same as that in the case of a single crystal silicon base member; (iii) the process yield in the case of a polycrystalline silicon member with a release agent and which is of $10/cm^2$ or less in therms of the number of defects of more than 1 μm in diameter is slightly inferior to that in the case of a polycrystalline silicon member with a release agent and which is of $5/cm^2$ or less in therms of the number of defects of more than 1 μm in diameter; and (iv) the process yield in the case of a polycrystalline silicon member with a release agent and which is of $50/cm^2$ or less in therms of the number of defects of more than 1 μm in diameter is markedly inferior, and the polycrystal silicon base member is practically unacceptable. In addition, the polycrystalline silicon member with a release agent and which is of $100/cm^2$ or less in therms of the number of defects of more than 1 μm in diameter is practically unacceptable also. Based on these findings, there was obtained the following knowledge. That is, in order for a polycrystalline silicon material to be usable as the base member for a substrate for liquid jet recording head, it is required to have a surface with a surface flatness (a surface smooth state) preferably of $10/cm^2$ or less, more preferably of $5/cm^2$ in therms of the number of defects of more than 1 μm in diameter.

Experiment E

In this experiment, studies were made in the viewpoint of eliminating occurrence of surface steps in a polycrystalline silicon member in the case of using said polycrystalline silicon member as the base member for a substrate for liquid jet recording head.

As previously described, in the case of using a single crystal silicon material as the base member for a substrate for liquid jet recording head, a heat accumulating layer is usually formed on the surface of the single crystal silicon base member for the purpose of attaining a desirable balance between the heat radiating property and the heat accumulating property so that the resulting liquid jet recording head exhibits good characteristics. As the heat accumulating layer in this case, there is usually employed a $SiO_2$ layer formed by thermally oxidizing the surface of the single crystal silicon base member.

In this experiment, using a polycrystalline silicon member instead of the above single crystal silicon base member, a $SiO_2$ layer as the heat accumulating layer was formed by thermally oxidizing the surface of the polycrystalline silicon member, and the surface state of the resultant $SiO_2$ layer was examined. As a result, it was found that steps of some thousands angstroms in terms of maximum degree are present among the crystal grains at the surface of the $SiO_2$ layer.

In the case where such steps are present at the surface of the base member for a substrate for liquid jet recording head, damages are forced to centralize in the vicinity of such step by virtue of a thermal shock caused upon heating and cooling or/and a cavitation caused upon discharging a recording liquid, and if a heat generating resistor having being formed on such step, a problem entails in that the reliability is reduced particularly in terms of durability. Especially, in the case where recording liquid discharging is repeated at a high speed, the cavitation is centralized in the vicinity of such step and as a result, a rupture is occurred at the heat generating resistor at a relatively earlier stage. As a mean in order to solve these problems, there is considered a manner of forming the above $SiO_2$ layer and flattening the surface of the $SiO_2$ layer by the polishing technique. But, the above problems cannot be satisfactorily solved by this manner.

Incidentally, the $SiO_2$ layer, which is accompanied by such surface steps of some thousands angstroms as above described, is desired to be of a thickness of some microns. In order to solve the above problems without hindering the function of the $SiO_2$ layer, there is considered another manner of making the $SiO_2$ later thickened to a remarkable extent and polishing the surface thereof to a certain extent. However, this manner is practically unacceptable also, since the $SiO_2$ layer having an excessive thickness does not function as the heat accumulating layer, and in addition, the formation of such excessively thick $SiO_2$ layer is not economical.

Independently, the formation of the heat accumulating layer (that is, the $SiO_2$ layer) was conducted by means of each of sputtering, thermal-induced CVD, plasma CVD, and ion beam evaporation techniques. In any case, there were found problems such that the film thickness is uneven, the film-forming period is relatively long, or foreign matters generated during the film formation are contaminated into a film to result in providing protrusions having a size of some microns in diameter, which will eventually become causes of causing the foregoing rupture by virtue of a cavitation. It was also found that such protrusion occurred permits an electric current to leak therethrough, resulting in causing a shortcircuit. Based on these findings, there was obtained a knowledge that the vacuum film-forming method is not suitable for the formation of the foregoing heat accumulating layer (that is, the $SiO_2$ layer).

Then, the formation of the heat accumulating layer (that is, the $SiO_2$ layer) was formed by means of each of the spin-on-glass method and the dip-pulling method. As a result, it was found that any of the $SiO_2$ films formed by these methods is poor in film quality, any of these methods is difficult to attain a desired film quality, contamination of foreign particles into a film formed is often occurred in any of these methods, and therefore, any of these methods is not suitable for the formation of the foregoing heat accumulating layer.

Studies were made of the reason why the foregoing steps are occurred at the surface of a $SiO_2$ film as the heat accumulating layer when it is formed by thermally oxidizing the surface of the foregoing polycrystalline silicon base member. As a result, there were obtained findings that a plurality of crystal grains constituting the polycrystalline material are not constant in terms of crystal orientation and they are different one from the other, and because of this, those crystal grains are thermally oxidized at a different oxidation speed, resulting in causing such steps.

As above described, any of the foregoing manners is not effective for eliminating the occurrence of such steps.

In view of this, the present inventor tried to conduct the formation of the $SiO_2$ layer (the heat accumulating layer) through thermal oxidation onto the surface of the foregoing polycrystalline silicon base member not by way of the direct manner but by way of an indirect manner. Particularly, on the surface of the foregoing polycrystalline silicon base member, there was formed a layer (a barrier layer in other words) composed of a material capable of exhibiting a function similar to that exhibited by the heat accumulating layer (the $SiO_2$ layer) and which is capable of permitting oxygen gas to pass through to the surface of the polycrystalline silicon base member, and the surface of the polycrystalline silicon base member was thermally oxidized while introducing oxygen gas through the barrier layer. As a result, there could be formed a $SiO_2$ layer on the surface of the polycrystalline silicon base member in a state that is free of such steps as above described.

In the following, with reference to FIGS. 4(A) through 4(C), description will be made of the findings obtained by the present inventor through experiments with regard to the reason why the $SiO_2$ layer formed by directly thermally oxidizing the surface of the polycrystalline silicon base member is accompanied by surface steps and also with regard to the reason why the $SiO_2$ layer formed by indirectly thermally oxidizing the surface of the polycrystalline silicon base member is not accompanied by surface steps.

That is, when a polycrystalline base member 11 as such shown in FIG. 4(A) itself is thermally oxidized, its volume is increased upon conducting the thermal oxidation and the constituent crystal grains 12 are individually oxidized at a different oxidation speed because these crystal grains are different one from the other in terms of crystal orientation, and because of this, as shown in FIG. 4(B), the thickness of the resulting thermal oxide film 13 becomes different depending on each of the crystal grains 12, resulting in causing steps at the surface. The broken line a in FIG. 4(B) indicates the surface position of the polycrystalline silicon base member 11 prior to the thermal oxidation. Particularly, for instance, when an about 3 μm thick thermal oxide film (that is, a $SiO_2$ layer) is formed on the surface of the polycrystalline silicon base member 11, steps caused at the surface of the thermal oxide film are of about 1000 Å.

Herein, description will be made of the thermal oxidation process of the surface of the polycrystalline silicon material. At the very beginning state of the formation of the thermal oxide film, a linear relationship is established between the thickness of the thermal oxide film 13 and the oxidation speed. That is, the reaction of oxygen gas ($O_2$) at the interface between the silicon (Si) and the silicon oxide ($SiO_2$) constituting the thermal oxide film becomes a rate-limiting factor. In this case, the oxidation speed of the oxygen gas is different depending on the crystal orientation. On the other hand, after the thermal oxide film 13 having been formed to a certain extent, the process of the oxygen gas to be diffused in this thermal oxide film becomes a rate-limiting factor. It is considered that the diffusing speed of the oxygen gas in the thermal oxide film 13 is not governed by the crystal orientation of the silicon crystal grain 12. In this connection, it is presumed that a step at the surface of the thermal oxide film formed as for each of the crystal grains 12 of the polycrystalline silicon base member 11 will be occurred at the very beginning stage of forming the thermal oxide film.

When a barrier layer 14 capable of restricting the diffusing speed of the oxygen gas is formed on the surface of the polycrystalline silicon base member 11 prior to starting the thermal oxidation and thereafter, the thermal oxidation treatment is conducted, the speed for the oxygen gas to be diffused and transmitted in the barrier layer 14 becomes a rate-limiting factor, and because of this, the formation speed of the thermal oxide film 13 becomes constant without depending on the crystal orientation of the crystal grain 12 present at the surface of the polycrystalline silicon base member 11, as shown in FIG. 4(C). This means that by conducting the thermal oxidation treatment after having formed the barrier layer 14, a step is prevented from occurring at the surface of the $SiO_2$ layer (the heat accumulating layer).

In order to confirm the effects provided by disposing the above barrier layer, experiments were conducted by preparing a substrate for liquid jet recording head.

Firstly, a polycrystalline silicon ingot was produced by the foregoing casting technique. The resultant ingot was quarried at the position with a mean crystal grain size of about 2 mm to obtain a rectangular plate. The plate obtained was subjected to lapping treatment and polishing treatment, to thereby obtain a polycrystalline silicon base member of 300×150×1.1 (mm) in size and having a mirror-ground surface with a surface roughness of Rmax 150 Å.

On the entire surface of the polycrystalline silicon base member, there was formed a 0.04 μm thick $SiO_2$ layer (the barrier layer) in accordance with the magnetron sputtering technique.

Thereafter, in accordance with the same procedures and under the same conditions as in Experiment B, the surface of the polycrystalline silicon base member was thermally oxidized through the barrier layer. After the thermal oxidation treatment having been completed, the barrier layer was removed by a conventional reactive etching technique using $CHF_3$-$C_2F_6$-$O_2$ gas.

This removal of the barrier layer was conducted for the following reason. That is, there was a fear that since the barrier layer had been formed by the magnetron sputtering techique, $SiO_2$ films deposited on the inner wall face of the film-forming chamber used would have been released to produce fine particles and these particles would have been contaminated into the barrier layer.

In this way, there was obtained a polycrystalline silicon base member having a heat accumulating layer comprising a thermal oxide film (a $SiO_2$ film) formed thereon. The thickness of the heat accumulating layer (that is, the $SiO_2$ layer) was found to be 2.9 μm.

As a result of examining the surface of the heat accumulating layer by means of a conventional surface profiler by stylus, no step was found at the surface of the heat accumulating layer.

On the surface of the resultant base member, there were formed a plurality of heat generating resistor each comprising $HfB_2$ (size: 20 μm×100 μm, thickness: 0.16 μm, wiring density: 16 Pal (that is, 16/mm)) and a plurality of A1 electrodes (width: 20 μm, thickness: 0.6 μm) each being connected one of the heat generating resistors. Then, a protective layer comprising $SiO_2$/Ta was formed above each portion where the heat generating resistor and electrode were formed by means of a conventional sputtering technique. Thus, there was obtained a substrate for liquid jet recording head of the configuration shown in FIGS. 1(A) and 1(B).

Successively, a plurality of liquid pathways and a liquid chamber were formed using a dry film, followed by cutting with the use of a slicer to form a plurality of discharging outlets, whereby a liquid jet recording head of the configuration shown FIGS. 5(A) and 5(B) was obtained.

As for the resultant liquid jet recording head, the discharging durability test was conducted by repeatedly applying 1.1 Vth (Vth: discharging threshold voltage) and a driving pulse (a printing signal) with a pulse width of 10 μs to each of the heat generating resistors to thereby discharge ink from each of the discharging outlets.

The evaluation of the durability of the liquid jet recording head was conducted by obtaining a survival rate of the heat generating resistors, specifically, the number of the heat generating resistors not disconnected versus the total number of the heat generating resistors, when the integrated value of the driving pulses became each of $1\times10^7$, $1\times10^8$ and $3\times10^8$. The evaluated results are shown in the column Sample No. 3 of Table 5.

Separately, for the comparison purpose, the above procedures were repeated, except that the thermal oxidation treatment of the polycrystalline silicon base member was conducted without forming the barrier layer, to thereby obtain a comparative liquid jet recording head.

As for the resultant comparative liquid jet recording head, the discharging durability test was conducted in the same manner as in the above case. The results obtained are shown in the column of Sample No. 1 of Table 5.

In comparison of the foregoing example (Sample No. 3) with the comparative example (Sample No. 1), it is understood that in the case of Sample No. 3, no cavitation disconnection is occurred and the survival rate is 100% even after $3\times10^8$ times repetition of the driving pulse, but in the case of Sample No. 1 based on the prior art, the heat accumulating layer of which being accompanied by steps at the surface, a cavitation disconnection is occurred at an early stage, and the survival rate is markedly low. Based on these facts, it was recognized that by disposing a barrier layer with a desired thickness on a polycrystalline silicon base member and conducting the thermal oxidation treatment for the surface of the base member through the barrier layer, there can be formed a desirable heat accumulating layer with on accompaniment of steps, and there can be obtained a desirable liquid jet recording head which provides superior results in the discharging durability test.

In the following, description will be made of experiments conducted in order to form a desirable heat accumulating layer on a polycrystalline silicon base member for a substrate for liquid jet recording head.

It is known that in the case where the heat accumulating layer of a liquid jet recording head is excessively thick, the cooling efficiency becomes insufficient as well as in the case of using a glass base member, and because of this, the driving frequency for discharging ink cannot be increased; and in the case where the heat accumulating layer is excessively thin, a desirable temperature raise is difficult to attain for the heat generating resistors, and because of this, the application of a high power is necessitated; therefore, the thickness of the heat accumulating layer is selected in the range of 1 μm to 3 μm.

In the viewpoint of this, in this experiment, the thickness of the heat accumulating layer was properly adjusted by varying the thickness of the barrier layer.

Firstly, there were obtained a plurality of polycrystalline silicon base members each having a mirror-ground surface with a surface roughness of Rmax 150 Å by repeating the procedures in the above experiment wherein the barrier layer was used.

On the entire surface of each of the polycrystalline silicon base members, there was formed a $SiO_2$ layer (that is, a barrier layer) with a different thickness selected from the group consisting of 0.004 μm, 0.1 μm, 1 μm, 10 μm, 20 μm, and 50 μm.

As for each of the resultant polycrystalline silicon base members, the surface thereof was subjected to thermal oxidation treatment through the barrier layer in the same manner as in the above experiment wherein the barrier layer was used. After the thermal oxidation treatment having been completed, the barrier layer was removed by a conventional reactive etching technique using $CHF_3$-$C_2F_6$-$O_2$ gas. Thus, there were obtained a plurality of polycrystalline silicon base members each having a heat accumulating layer comprising a $SiO_2$ layer formed on the surface thereof. The respective heat accumulating layers (that is, the $SiO_2$ layers) were of 3 μm, 2.8 μm, 2 μm, 1 μm, 0.5 μm, and 0.3 μm in thickness, respectively. The relationship between the thickness of the barrier layer and the thickness of the heat accumulating layer obtained in each case was shown in each of the columns of Sample No. 2, No. 3, No. 4, No. 5, No. 6, No. 7 and No. 8 of Table 5.

In the case of each of Sample No. 7 and Sample No. 8, a necessary layer thickness could not be attained for the thermal oxide layer.

As a result of examining the surface state of the thermal oxide layer as for each sample using a conventional profiler by stylus, it was found that surface steps are present at the surface of the thermal oxide layer of Sample No. 2 in which the barrier layer is of 40 μ in thickness but as for each of the remaining samples, that is, Sample Nos. 4, 5, 6,7 and 8, no surface step is present at the surface of the thermal oxide layer.

Based on the results obtained in the confirmation experiment of Sample No. 3 and the results obtained in the above experiments, there was obtained a finding that a heat accumulating layer (that is, a thermal oxide layer) with no surface step and having a thickness of 1 μm to 3 μm can be obtained in the case where a barrier layer having a thickness of 0.04 μm to 10 μm is disposed, and superior results are provided in the discharging durability test.

In addition, using each of the base members of Sample Nos. 4, 5 and 6, a liquid jet recording head was prepared in the same manner as in the foregoing confirmation experiment, and the discharging durability test was conducted also in the same manner as in the foregoing confirmation experiment. The results obtained are as shown in the columns of Sample Nos. 4, 5 and 6 of Table 5. In each of these cases, no cavitation disconnection was occurred, and the survival rate was 100% even after $3\times10^8$ times repetition of the driving pulse.

Based on the results obtained in the confirmation experiment of Sample No. 3 and the results obtained in the above experiments, there was obtained a finding that a desirable heat accumulating layer with no surface step can be obtained by disposing a barrier layer having a thickness of 0.04 μm to 10 μm and conducting the thermal oxidation treatment through the barrier layer, and superior results are provided in the discharging durability test.

DESCRIPTION OF THE PREFERRED EMBODIMENTS

The substrate for liquid jet recording head to be provided according to the present invention includes an electrothermal converting body comprising a heat generating resistor capable of generating thermal energy and a pair of wirings electrically connected to said heat generating resistor, characterized in that said substrate includes a base member constituted by a polycrystalline material such as polycrystalline silicon or the like.

The liquid jet recording head to be provided according to the present invention includes a liquid discharging outlet; a substrate for liquid jet recording head including an electrothermal converting body comprising a heat generating resistor capable of generating thermal energy for discharging liquid from said discharging outlet and a pair of wirings electrically connected to said heat generating resistor, said pair of wirings being capable of supplying an electric signal for generating said thermal energy to said heat generating resistor; and a liquid supplying pathway disposed in the vicinity of said electrothermal converting body of said substrate, characterized in that said substrate includes a base memer constituted by a polycrystalline material such as polycrystalline silicon material or the like.

The liquid jet recording apparatus to be provided according to the present invention includes (a) a substrate for liquid jet recording head including a liquid discharging outlet, an electrothermal converting body comprising a heat generating resistor capable of generating thermal energy for discharging liquid from said discharging outlet and a pair of wirings electrically connected to said heat generating resistor, said pair of wirings being capable of supplying an electric signal for generating said thermal energy to said heat generating body, and (b) a liquid supplying pathway disposed in the vicinity of said electrothermal converting body of said substrate, characterized in that the said substrate (a) includes a base member constituted by a polycrystalline material such as polycrystalline silicon material or the like.

The process according to the present invention is for producing a substrate for liquid jet recording head wherein an electrothermal converting body comprising a heat generating resistor and a pair of wirings electrically connected to said heat generating resistor is formed on a base member, which is characterized by including the steps of using a member composed of a polycrystalline material such as polycrystalline silicon or the like as said base member, forming a barrier layer capable of controlling the speed of oxygen gas to be transmitted on the surface of said base member, and subjecting the surface of said base member to thermal oxidation through said barrier layer to thereby form an oxide layer on said base member.

A typical example of the base member constituting the substrate for liquid jet recording head in the present invention, there can be mentioned a base member composed of a polycrystalline silicon material (this will be hereinafter referred to as a polycrystalline silicon base member). The polycrystalline silicon base member is rather difficult to be deformed in comparison with a single crystal silicon base member. Because of this, as described in the foregoing experiments, the polycrystalline silicon base member provides a prominent effect in that the elongation of a recording head, which is hardly attained in the case of using a single crystal silicon base member, can be effectively attained. For this, the foregoing thermal oxide layer to be formed on the polycrystalline silicon base member is an important factor. Particularly, as described in the foregoing experiments, the polycrystalline silicon base member is usually poor in surface flatness due to the constituent crystal grains and therefore, when a thermal oxide layer is formed on the surface of the polycrystalline silicon base member, the resulting thermal oxide unavoidably becomes to have a surface accompanied by steps.

In the present invention, the thermal oxide layer is formed by way of forming the barrier layer on the surface of the polycrystalline silicon base member and thermally oxidizing the surface of the polycrystalline silicon base member through the barrier layer. By this, the problem relating to the occurrence of steps can be effectively eliminated. As apparent from the results obtained in the foregoing experiments, the reason why the polycrystalline silicon base member is hardly deformed is considered such that the grain boundaries therein provide a resistance for occurrence of a sliding deformation whereby preventing the base member from being deformed.

In the present invention, the polycrystalline silicon base member having such advantages is used as a constituent of a substrate for liquid jet recording head. Therefore, if a internal stress should be generated in the base member due to a uneven shrinkage caused upon heating or cooling the base member at the time of subjecting the surface of the base member to the thermal oxidation treatment, no problematic deformation is occurred at the base member. In addition to this, the use of the polycrystalline silicon base member in the substrate for liquid jet recording head provides further advantages such that the substrate can be lengthened to a desired length wherein, as described in the foregoing Experiment B, the warp magnitude is slight and is smaller than that of the single crystal silicon base member, and therefore, an elongated liquid jet recording head which is free of the problems relating the warp can be easily and effectively obtained. The elongated recording head is free of the problems relating to occurrence of defects for an image recorded which are caused in the case of an elongated liquid jet recording head obtained by integrating a plurality of miniature recording heads. Further, the elongated liquid jet recording head according to the present invention can effectively attain high speed recording.

The warp magnitude is, as described in the foregoing Experiment C, proportional to the mean crystal grain size of the polycrystalline silicon material constituting the base member. In order to attain a desirable yield in the production of the liquid jet recording head according to the present invention, the polycrystalline silicon material constituting the base member for the substrate for liquid let recording head is desired to be preferably of 8 μm or less, more preferably of 2 μm or less in terms of mean crystal grain size. To use a polycrystalline silicon base member having a mean crystal grain size in said range enables to obtain a desirable substrate for liquid jet recording head which is free of occurrence of a warpage, and as a result, an elongated liquid let recording head capable of providing a high quality recorded image at a high recording speed can be easily and effectively attained.

On the polycrystalline silicon base member for the substrate for liquid let recording head, a heat generating resistor layer and wirings are disposed. Therefore, the polycrystalline silicon base member is desired not to have defects such as pits, protrusions, or the like at the surface thereof. In the case where these defects are present at the surface of the base member, such defect is liable to lead to causing a disconnection or shortcircuit for the heat generating resistor layer formed thereon. As described in the foregoing Experiment D, in order to attain a high production yield and in order to attain desirable recording characteristics as for the liquid jet recording head, the polycrystalline silicon base member used for the substrate for liquid jet recording head is desired to be such that the number of such defects of about 1 μm in diameter present at the surface thereof is preferably $10/cm^2$ or less, more preferably $5/cm^2$.

The polycrystalline silicon material constituting the base member may contain a slight amount of such impurities as contained in a single crystal silicon material constituting the single crystal base member.

In the present invention, in order to eliminate the problem relating to the occurrence of a surface step at the time of forming a thermal oxide film by thermally oxidizing the surface of the polycrystalline silicon base member for the substrate for liquid jet recording head, a barrier layer capable controlling the speed of oxygen gas to be transmitted is formed on the polycrystalline silicon base member, and the surface of the polycrystalline silicon base member is thermally oxidized through the barrier layer, whereby forming a thermal oxide layer. By this, there can be obtained a polycrystalline silicon base member having a thermal oxide layer excelling in surface flatness formed thereon.

As for the constituent material of the barrier layer, firstly, it is necessary to have a heat resistance at least to the thermal oxidation temperature.

Incidentally, the formation of a thermal oxide film on a semiconductor substrate is usually conducted at a temperature of 850° C. to 1000° C.

However, the thickness of the thermal oxide film to be formed as the heat accumulating layer on the surface of the base member for the substrate for liquid jet recording head is thick as much as some microns. Therefore, the formation of the thermal oxide film on the base member is usually conducted at a relatively high temperature of 1000° C. to 1250° C. In view of this, the barrier layer is important to have a heat resistance at least to a temperature of 1000° C. or more, preferably a heat resistance to a temperature of 1200° C., or more.

Secondary, the constituent material of the barrier layer is necessary to be such a material that can provide a highly dense film capable of precisely controlling the speed of oxygen gas to be transmitted. In the case where the barrier layer is formed of a porous material, the silicon material is permitted to directly contact with oxygen gas, resulting in remarkably causing a surface step.

Thirdly, the constituent material of the barrier layer is necessary to be such a material that the amount of oxygen gas to be transmitted therethrough is not largely changed with time. In the case where the barrier layer is formed of a material in which the amount of oxygen gas to be transmitted is largely changed with time, the transmission speed of the oxygen gas cannot be controlled as desired, and because of this, problems entail in that a desired thickness cannot be attained for the thermal oxide layer to be formed or a surface step is occurred at the thermal oxide layer formed. Thus, such material does not exhibit desired functions.

In view of the above, as the constituent material of the barrier layer, any material can be used as long as it satisfies the above described three conditions. Specifically, inorganic materials which satisfy the above described three conditions and enable to relatively easily form the barrier layer such as titanium oxide, cobalt oxide and silicon oxide are the most desirable.

In general, the barrier layer is removed by means of a conventional selective etching technique after the thermal oxidation treatment has been completed. However, in the case where no disadvantage is provided, it is possible to maintain the barrier layer without being removed. A typical example of the case where no disadvantage is provided without removing the barrier layer is the case where the barrier layer is formed of silicon oxide.

The barrier layer in the present invention can be formed by any film-forming method as long as it enables to form a dense film. Specific examples of such film-forming method are CVD methods such as thermal-induced CVD method, light-induced CVD method and plasma CVD method, sputtering method, and vacuum evaporation method.

The thickness of the barrier layer should be properly determined with a due care about the thickness of the thermal oxide layer formed on the polycrystalline silicon base member and also with a due care so that no surface step is occurred at the surface of the thermal oxide layer. In general, the thickness of the thermal oxide layer is made to be in the range of 1 μm to 3 μm. The thickness of the barrier layer which does not cause the formation of a surface step at the surface of the thermal oxide layer to be formed is, as described in the foregoing Experiment E, in the range of 0.04 μm to 10 μm.

In the following, description will be made of an embodiment of the substrate for liquid jet recording head according to the present invention.

FIG. 1(A) is a schematic plan view illustrating the principal part of an example of the substrate for liquid jet recording head according to the present invention. FIG. 1(B) is a schematic cross-sectional view, taken along the line X—X' in FIG. 1(A). FIG. 2 is a schematic cross-sectional view illustrating a base member constituting said substrate for liquid jet recording head.

A substrate 8 for liquid jet recording head has, on a polycrystalline silicon base member 1, a electrothermal converting body comprising a heat generating resistor **2*a* capable of generating thermal energy for discharging a liquid recording medium and a pair of wirings 3*a* and 3*b***.

After having laminated a heat generating resistor 2 comprising a material with a relatively large volume resistivity and an electrode layer 3 comprising a material having a good electroconductivity on the polycrystalline silicon base member 1, for example, by a conventional sputtering technique, the heat generating resistor **2*a* and the wirings 3*a* and 3*b* are formed respectively in a given pattern by way of the lithography process. The heat generating resistor thus formed serves to energize upon applying an electric signal to the heat generating resistor through the wirings 3*a* and 3*b***.

The material constituting the heat generating resistor layer 2 can include hafnium boride ($HfB_2$), tantalum nitride ($Ta_2N$), rubidium oxide ($RuO_2$), Ta-Al alloy, and Ta-Al-Ir alloy, other than these, various metals, alloys, metal compounds, and cermets.

The material constituting the electrode layer 3 can include metals having a high electroconductivity such as aluminum, gold and the like.

The substrate for liquid jet recording head 8 includes a protective layer 4 which is disposed so as to cover the wirings **3*a* and 3*b* and the heat generating resistor 2*a*. The protective layer 4 is disposed for the purpose of preventing the heat generating resistor 2*a* and the wirings 3*a* and 3*b*** from suffering not only from electric corrosion but also from electric breakdown which will be occurred when they are contacted with ink or when ink is permeated thereinto. The protective layer may be formed of an electrically insulative material such as $SiO_2$, SiC, $Si_3N_4$, or the like. The protective layer may be of a multilayered structure. In this case, the protective layer may take a tacked structure, for example, comprising a layer formed of said electrically insulative material and a layer formed of Ta or $Ta_2O_5$ being stacked on the former layer.

In the case where the foregoing barrier layer is free of a fear of providing a negative influence to not only the successive production step but also to the performance of a liquid jet recording head obtained, it is possible to form the heat generating resistor layer 2 and the electrode later 3 on the surface thereof while maintaining the barrier layer.

The above embodiment of the liquid jet recording head is of the configuration wherein the direction in which a liquid recording medium is discharged from the discharging outlet and the direction in which a liquid recording medium is supplied toward the heat generating resistor are substantially the same, but it can take another configuration wherein the two directions are different from each other (for instance, they are substantially perpendicular to each other).

In the following, description will be made of an embodiment of a liquid jet recording head in which the above described substrate is used.

The principal of the recording head previously has been explained with reference to FIG. 5(A) and FIG. 5(B). Herein, description again will be made. A liquid pathway 6 for supplying ink is formed in the vicinity of each heat generating resistor **2*a* by connecting a top plate 5** to the substrate. The ink in the liquid pathway is heated by the heat generating resistor to cause a bubble, wherein the ink is discharged through a discharging outlet by virtue of a pressure caused upon forming the bubble, whereby performing recording.

In the configuration shown in FIG. 5(A) and FIG. 5(B), there is shown a arrangement in which one heat generating resistor corresponds to one discharging outlet. However, the recording head of the present invention is not limited to this configuration only. That is, any other configurations including, for instance, a configuration in which a plurality of heat generating resistors correspond to one discharging outlet, can be employed as long as the foregoing substrate can be applied. Further, in the configuration shown in FIG. 5(A) and FIG. 5(B), the substrate surface on which the heat generating resistors are arranged is substantially in parallel to the direction in which the ink is discharged. The recording head of the present invention is not limited to this configuration only, but may take such a configuration that the direction in which the ink is discharged is in a relationship of crossing with the substrate surface.

The liquid jet recording head of the present invention may be designed such that it can be mounted in an apparatus capable of being a recording apparatus, for instance, in a detachable state, wherein ink is supplied from a separate ink container through a tube. Other than this, it may be designed such that it can be detachably amounted in an apparatus capable of being a recording apparatus while being detachably connected to a separate ink container.

As the liquid recording medium usable in the recording head of the present invention, there can be used various kinds. Examples of such liquid recording medium are liquid recording mediums having an ink composition comprising 0.5 to 20 wt. % of dye, 10 to 80 wt. % of water-soluble organic solvent such as polyhydric alcohol, polyalkylene glycol, or the like, and 10 to 90 wt. % of water. As a specific example of such ink composition, there can be mentioned one comprising 2.3 wt. % of C.I. food black, 25 wt. % of diethylene glycol, 20 wt. % of N-methyl-2-pyrrolidone, and 52 wt. % of water.

FIG. 6 is an appearance perspective view illustrating an example of an ink jet recording apparatus IJRA in which the recording head of the present invention is used as an ink jet head cartridge IJC. In FIG. 6, reference numeral 120 indicates the ink jet head cartridge IJC provided with nozzle groups capable of discharging ink to the face of a recording member transported onto a platen 124. Reference numeral 116 indicates a carriage HC which serves to hold the IJC 120. The carriage HC is connected to a part of a driving belt 118 capable of transmitting a driving force such that it can be slidably moved together with two guide shafts 119A and 119B arranged in parallel with each other. By this, the IJC 120 is allowed to move back and forth along the entire of the recording member.

Herein, although the ink jet head cartridge as the recording head comprises a miniature recording head, it is a matter of course that the elongated recording head of the present invention, which is designed, for example, to be of a so-cally full line type capable of performing recording for a given recording width of a recording member used, can be used. In the case of using such elongated recording head, there can be attained a recording apparatus in which the foregoing advantages of the elongated recording head, namely, an advantage of being free of warpage, an advantage of being free of the problems of causing defects for an image recorded which are found in the case of using a relatively short recording head, and an advantage of making it possible to conduct high speed recording, are fully effectively used.

Reference numeral 126 indicates a head restoring device which is disposed at one end of the moving passage of the IJC 120, specifically at the position opposite the home position. The head restoring device 120 is operated by virtue of a driving force transmitted through a driving mechanism 123 from a motor 122, whereby capping the IJC 120. In relation to the capping for the IJC 120 by a cap member 126A of the head restoring device, the discharge restoration treatment of removing adhesive ink in the nozzles is conducted by way of ink sucking by means of an appropriate sucking means disposed in the head restoring device 126 or by way of ink pressure transportation by means of an appropriate pressurizing means whereby forcedly discharging the ink through the discharging outlets. When the recording is terminated, the IJC is protected by capping it.

Reference numeral 130 indicates a cleaning blade comprising a wiping member formed of a silicon rubber which is arranged at a side face of the head restoring device 126. The cleaning blade 130 is supported by a blade supporting member 130A in a cantilever-like state. As well as in the case of the head restoring device 126, the cleaning blade 130 is operated by virtue of a driving force transmitted through the driving mechanism 123 from the motor 122, wherein the cleaning blade is made capable of contacting with the discharging face of the IJC 120. By this, the cleaning blade 130 is projected into the moving passage of the IJC 120 timely with the recording performance of the IJC 120 or after the discharge restoration treatment using the head restoring device having been completed to thereby remove dew drops, wettings, dirts, and the like deposited on the discharging face of the IJC 120.

The recording apparatus is also provided with an electric signal applying means for applying an electric signal to the recording head. Further, the recording apparatus includes, other than the above embodiment of conducting recording to a recording member, an embodiment comprising a textile printing apparatus of recording patterns to a fabric or the like. In the case of the. textile printing apparatus, it is necessary to conduct recording to a fabric with an extremely wide width, wherein the elongated recording head of the present invention is very effective.

Other Embodiments

The present invention provides prominent effects in an ink jet recording head and ink jet recording apparatus of the system in which ink is discharged utilizing thermal energy. As for the representative constitution and the principle, it is desired to adopt such fundamental principle as disclosed, for example, in U.S. Pat. No. 4,723,129 or U.S. Pat. No. 4,740,796. While this system is capable of applying either the so-called on-demand type or the continuous type, it is particularly effective in the case of the on-demand type because, by applying at least one driving signal for providing a rapid temperature rise exceeding nucleate boiling in response to recording information to an electrothermal converting body disposed for a sheet on which liquid (ink) is to be held or far a liquid pathway, the electrothermal converting body generates thermal energy to cause film boiling on a heat acting face of the recording head and as a result, a gas bubble can be formed in the liquid (ink) in a one-by-one corresponding relationship to such driving signal.

By way of growth and contraction of this gas bubble, the liquid (ink) is discharged trough a discharging outlet to form at least one droplet. It is more desirable to make the driving signal to be of a pulse shape, since in this case, growth and contraction of a gas bubble take place instantly and because of this, there can be attained discharging of the liquid (ink) excelling particularly in responsibility.

As the driving signal of pulse shape, such driving signal as disclosed in U.S. Pat. No. 4,463,359 or U.S. Pat. No. 4,345,262 is suitable. Additionally, in the case where those conditions disclosed in U.S. Pat. No. 4,313,124, which relates to the invention concerning the rate of temperature rise at the heat acting face, are adopted, further improved recording can be performed.

As for the constitution of the recording head, the present invention incudes, other than those constitutions of the discharging outlets, liquid pathways and electrothermal converting bodies in combination (linear liquid flow pathway or perpendicular liquid flow pathway) which are disclosed in each of the above mentioned patent documents, the constitutions using such constitution in which a heat acting portion is disposed in a curved region as disclosed in U.S. Pat. No. 4,558,333 or U.S. Pat. No. 4,459,600.

In addition, the present invention may effectively take a constitution based on the constitution in which a slit common to a plurality of electrothermal converting bodies is used as a discharging portion of the electrothermal converting bodies which is disclosed in Japanese Unexamined Patent Publication No. 123670/1984 or another constitution based on the constitution in which an opening for absorbing a pressure wave of thermal energy is made to be corresponding to a discharging portion which is disclosed in Japanese Unexamined Patent Publication No. 138461/1984.

Further, in the case of an ink jet recording apparatus comprising a full-line type recording head having a length corresponding to the width of a maximum recording member onto which recording can be performed, the foregoing effects are more effectively provided. The present invention is effective also in the case where a recording head of the exchangeable chip type wherein electric connection to an apparatus body or supply of ink from the apparatus body is enabled when it is mounted on the apparatus body or other recording head of the cartridge type wherein an ink tank is integrally disposed on the recording head itself is employed.

Furthermore, the present invention is extremely effective not only in a recording apparatus which has, as the recording mode, a recording mode of a main color such as black but also in a recording apparatus which includes a plurality of different colors or at least one of full-colors by color mixture, in which a recording head is integrally constituted or a plurality of recording heads are combined.

In the above-described embodiments of the present invention, explanation has been made with the use of liquid ink, but it is possible to use such ink that is in a solid state at room temperature or other ink which becomes to be in a softened state at room temperature in the present invention. In the foregoing ink jet apparatus, it is usual to adjust the temperature of ink itself in the range of 30° C. to 70° C. such that the viscosity of ink lies in the range capable of being stably discharged. In view of this, any ink can be used as long as it is in a liquid state upon the application of a use record signal. It is also possible to those inks having a property of being liquefied, for the first time, with thermal energy, such as ink that can be liquefied and discharges in liquid state upon the application of thermal energy depending upon a record signal or other ink that can start its solidification beforehand at the time of its arrival at a recording member in order to prevent the temperature of the head from raising due to thermal energy purposely used as the energy for a state change of ink from solid state to liquid state or in order to prevent ink from being vaporized by solidifying the ink in a state of being allowed to stand. In the case of using these inks, they can be used in such a manner as disclosed in Japanese Unexamined Patent Publication No. 56847/1979 or Japanese Unexamined Patent Publication No. 71260/1985 in which ink is maintained in concaved portions or penetrations of a porous sheet in a liquid state or in a solid state and the porous sheet is arranged to provide a configuration opposite the electrothermal converting body.

EXAMPLES

In the following, the features and advantages of the present invention will be described in more detail with reference to examples, but the scope of the present invention is not restricted by these examples.

Example 1

(preparation of a ploycrystalline silicon base member for a substrate for liquid jet recording head)

A polycrystalline silicon ingot as the stating material was prepared in the following manner. That is, there was firstly provided a high purity polycrystalline silicon material obtained in accordance with the conventional precipitation reaction manner through hydrogen reduction and pyrolysis, which is usually employed in the production of a single crystal silicon material. The polycrystalline silicon material was then introduced into a quartz crucible wherein it was fused at 1420° C. The resultant fused material was poured into a casting mold made of graphite wherein it was cooled, to thereby obtain a polycrystalline silicon ingot of 80 cm in square size. In this case, no release agent was used.

The ingot thus obtained was quarried at the position thereof with a mean crystal grain size of 2 mm by means of a milti-wire saw, to obtain four plate samples each having a different size shown in one of the columns Sample No. 1 to Sample No. 4 of Table 6. Each of the four plate samples was subjected to lapping treatment to remove an about 30 μm thick surface portion to thereby provide a flat surface therefor. The end portions of the resultant were chanferred by means of a beveling machine, followed by subjecting to polishing treatment using a single side polishing machine produced by Speedfarm Kabushiki Kaisha, to thereby obtain a mirror-ground member with a surface roughness of Rmax 150 Å. In this case, the polishing treatment was conducted without using an alkali, in order to prevent a surface step from being formed, which will be occurred due to that the etching by an alkali component contained in the abrasive material has a crystal orientation dependency. Thus, there were obtained four mirror-ground polycrystalline silicon plate samples.

As for each of the resultant polycrystalline silicon plate samples, namely, the polycrystalline silicon base members, its surface state was examined by the same surface examination manner using the inspection system for substrate surface employed in the foregoing Experiment D. As a result, each of the base members was found to be of less than $1/cm^2$ in terms of the number of defects based on irregularities in the maximum detectable range of more than 1 μm in diameter at all the measured points.

Further, each of the base member samples was examined with respect its surface flatness using a surface profiler by stylus produced by Lasertech Kabushiki Kaisha. As a result, each of the base member samples was found to be free of occurrence of a surface step.

As for each of the polycrystalline silicon base member samples, a $SiO_2$ film as the barrier layer was formed at a thickness of 0.04 μm on the surface thereof by the magnetron bias sputtering method. In this case, the film-forming conditions were employed.

ultimate vacuum: $8\times10^{-7}$ Torr preheating: at 300° C. for 5 minutes argon gas pressure: 10 mTorr target electric power: 2 kW presputtering period: 1 minute bias voltage: 100 V Then, as for each of the resultant polycrystalline silicon base members each having the barrier layer thereon, a $SiO_2$ film as the heat accumulating layer was formed by subjecting the surface to thermal oxidation treatment using the pyrogenic oxidation method. In this case, the following oxidation conditions were employed.

thermal oxidation temperature: 1150° C.

inner pressure: 1 atm thermal oxidation period: 14 hours

After the thermal oxidation treatment, the barrier layer was removed by the reactive ion etching technique using $CHF_3$-$C_2F_6$-$O_2$ gas.

In this way, there were obtained four polycrystalline silicon work in process samples (Sample No. 1 to Sample No. 4) for a substrate for liquid jet recording head, each having a 2.9 μm thick thermal oxide layer ($SiO_2$ layer) as the heat accumulating layer.

As for each of the samples Nos. 1 to 4, the surface flatness of the heat accumulating layer was examined by the surface profiler by stylus produced by Lasertech Kabushiki Kaisha. As a result, each of the samples was found to be free of a surface step.

Then, as for each of the samples No. 1 to No. 4, by using the photolithography technique, there were formed, on the surface thereof, a plurality of heat generating resistors each comprising $HfB_2$ (size: 20 μm×100 μm thickness: 0.16 μm, pitch interval: 63.5 μm) and a plurality of A1 electrodes (width: 20 μm, thickness: 0.6 μm) each being connected one of the heat generating resistors. Then, a protective layer comprising $SiO_2$/Ta (the thickness of the $SiO_2$ film: 1.3 μm, the thickness of the Ta film: 0.5 μm) was formed above each portion where the heat generating resistor and electrode were formed by means of a conventional sputtering technique. Thus, there were obtained four substrates for liquid jet recording head (Sample No. 1 to Sample No. 4) each having the configuration shown in FIGS. 1(A) and 1(B).

Successively, as for each of the resultant substrates for liquid jet recording head, a plurality of liquid pathways were formed in accordance with the photolithography technique using a dry film wherein exposure is conducted. Herein, in each case, evaluation was conducted by examining of whether those ink pathways could be precisely formed upon the exposure processing and obtaining an exposure fitness proportion.

Particularly, as for each substrate sample, 15 patten samples for liquid jet recording head each comprising a plurality of ink pathways for ink discharging were formed, wherein each of the 15 pattern samples for Sample No. 1 comprising 8576 ink pathways, each of the 15 pattern samples for Sample No. 2 comprising 7244 ink pathways, each of the 15 pattern samples for Sample No. 3 comprising 5504 ink pathways, and each of the 15 pattern samples for Sample No. 4 comprising 4288 ink pathways.

As for each of the resultant samples Sample No. 1 to Sample No. 4, an exposure fitness proportion was obtained on the basis of the criteria in that the case where a pattern defect was occurred with regard to at least one discharging outlet pattern as a result of the focusing position having been deviated due to a warpage of the base member among the 15 pattern samples is made to be unfitness, and the case where no such pattern defect was occurred is made to be fitness. The results obtained are collectively shown in Table 6.

As apparent from the results shown in Table 6, it is understood that all the samples Sample No. 1 to Sample No. 4 are of 100% in terms of exposure fitness proportion.

Comparative Example 1

(preparation of a single crystal silicon base member for a substrate for liquid jet recording head)

There was firstly provided a single crystal silicon ingot as the starting material. Using this single crystal silicon ingot and in accordance with the same manner employed in Example 1, there were obtained four mirror-ground single crystal silicon base member samples each having a different size shown in one of the columns Sample No. 1 to Sample No. 4 of Table 6 and having a surface roughness of Rmax 150 Å (Comparative Sample No. 1 to Comparative Sample No. 4). In each case, the polishing treatment was conducted with the addition of alkali. As for each of the resultants, there was formed a 3.0 μm thick thermal oxide heat accumulating layer by thermally oxidizing the surface thereof by the pyrogenic method in the same manner employed in Example 1 except for not forming the barrier layer. Thus, there were obtained four work in process samples for a substrate for liquid jet recording head (Comparative Sample No. 1 to Comparative Sample No. 4).

Using each of the four resultant samples, there were obtained four comparative substrate samples for liquid jet recording head by repeating the procedures of Example 1 (Comparative Sample No. 1 to Comparative Sample No. 4).

As for each of the resultant liquid jet recording head substrate samples Comparative Sample No. 1 to Comparative Sample No. 4, an exposure fitness proportion was evaluated in the same manner employed in Example 1. The results obtained are collectively shown in Table 8.

As apparent from the results shown in Table 6, it is understood that Comparative Sample No. 2 is of a reduced value in terms of exposure fitness proportion, and Comparative Sample No. 1 is substantially unfitness.

Example 2

(preparation of a liquid jet recording head using a polycrystalline silicon substrate)

In this example, using each of the four liquid jet recording head substrate samples (Sample No. 1 to Sample No. 4) shown in Table 6 which were prepared by repeating the procedures of Example 1, there were prepared four liquid jet recording heads of the configuration shown in FIG. 3 in the following manner.

As for each of the liquid jet recording head substrate samples, a plurality of ink pathways were formed thereon in accordance with the photolithography technique using a dry film. Using a slicer, the resultant was cut into a plurality of head units while forming a plurality of discharging outlets. Then, the discharging outlet face was polished to remove defects such as chipping cause at the time of the cutting treatment. Thus, as for each of the liquid jet recording head substrate samples, there were obtained 15 liquid jet recording head works in process. As for each of the 15 works in process obtained in each case, ICs for driving the heat generating resistors were electrically connected to the wirings in accordance with the flip chip bonding technique, to thereby obtain a liquid jet recording head with a discharging outlet pitch interval of 63.5 μm.

In this way, as for each of the liquid jet recording head substrate samples based on Sample No. 1 to Sample No. 4, there were obtained 15 liquid jet recording head samples (the four groups each comprising the 15 liquid jet recording heads based on each of Sample No. 1 to Sample No. 4 will be hereinafter referred to as Sample No. 1', Sample No. 2', Sample No. 3', and Sample No. 4", respectively).

The production process yield as for each of Sample No. 1' to Sample No. 4' was found to be within a normal level in which the yield is reduced as the number of nozzles is increased.

In the column relating to the production yield of Table 7, the mark ○ means no problem, wherein the production yield in each of Sample No. 1' to Sample No. 4' was within a production yield previously estimated based on the number of discharging outlets in each case.

Then, as for each of Sample No. 1' to Sample No. 4', one liquid jet recording head was randomly chosen, and it was dedicated for discharge durability test. The durability test was conducted by repeatedly applying 1.1 Vth (Vth: discharging threshold voltage) and a driving pulse (a printing signal) with a pulse width of 10 μs to each of the heat generating resistors whereby discharging ink from each of the discharging outlets.

The evaluation in the durability test was conducted by obtaining a survival rate of the heat generating resistors, specifically, the number of the heat generating resistors not disconnected versus the total number of the heat generating resistors, when the integrated value of the driving pulses became each of $1\times10^7$, $1\times10^8$ and $3\times10^8$. The evaluated results are collectively shown in Table 7.

As apparent from the results shown in Table 7, it is understood that the survival rate is 100% even after $3\times10^8$ times repetition of the driving pulse and thus, the durability is satisfactory in every case.

Successively, as for each of Sample No. 1' to Sample No. 4', another one liquid jet recording head was randomly chosen, and it was dedicated for evaluation of a printing performance, wherein a precision between the printed dots and appearance of uneven density were evaluated.

There was used ink of the following composition:

dye: C.I. direct black 19—3 wt. %, diethylene glycol—25 wt. %,

N-methyl-2-pyrrolidone—20 wt. %, and ion-exchanged water—52 wt. %.

In this evaluation, there was used a paper with a bleeding probability adjusted to be in a given range. The paper was scanned perpendicularly to the discharging direction of the liquid jet recording head while discharging ink from all the nozzles, to thereby obtain a printed sample having four different printed widths in the nozzle arrangement direction and with a printed area of 200 mm in the direction in which the paper was moved. In this case, the paper moving speed was adjusted so that the printing dot interval became 63.5 μm with a discharging frequency of 1KHz. The head driving conditions were made as follows.

voltage applied to the heat generating resistor: 1.1 Vth (Vth: discharging threshold voltage)

driving frequency: 1 KHz (the voltage applying interval to the heat generating resistor)

pulse width: 10 μs (the period of applying one pulse to the heat generating resistor)

In Table 7, there is shown a printing width as for each of the liquid jet recording head samples.

As for each printed sample obtained by each of the liquid jet recording head samples, evaluation was conducted with respect to printing precision and appearance of uneven density in the following manner.

Evaluation of printing precision:

As for each printed sample, the printed dot interval (the interval between the dot centers) was observed using a micrometer microscope, whereby a variation range was examined. In this case, the observation was conducted at 10 randomly selected positions each having an area of 2 cm in square size on the printed sample, wherein the direction perpendicular to the paper moving direction was made to be X and the paper moving direction was made to be Y, and the case where as for all the 10 positions each being of 2 cm in square size, the dot interval in the X direction and that in the Y direction were within a range of 43.5 μm to 83.5 μm was evaluated as being fitness. As a result, each of Sample No. 1' to Sample No. 4' was found to be fitness.

Evaluation of appearance of uneven density:

Each printed sample was evaluated with respect to appearance of uneven density using a Macbeth densitometer. In this case, the entire area of the printed sample was read out by the binary image processing by CCD line sensor system, wherein the optical density was measured as for every 1 cm width in the direction perpendicular to the paper moving direction. In this evaluation, the case where the optical densities of the adjacent regions were within 0.2 was evaluated as being fitness. As a result, each of Sample No. 1' to Sample No. 4' was found to be fitness.

Comparative Example 2

(preparation of a liquid jet recording head using a single crystal silicon substrate)

In this comparative example, using each of the four comparative liquid jet recording head substrate samples (Comparative Sample No. 1 to Comparative Sample No. 4) shown in Table 8 which were prepared by repeating the procedures of Comparative Example 1, there were prepared four comparative liquid jet recording head samples (Comparative Sample No. 1' to Comparative Sample No. 4') in the same manner employed in Example 2.

As for each of the resultant samples of Comparative Sample No. 1' to Comparative Sample No. 4', the production process yield was evaluated in the same manner as in Example 2. The results obtained are shown in Table 9. Shown in the column relating to the production yield of Table 9 are the results of the evaluation conducted based on the following criteria.

X: the case where no practically acceptable liquid jet recording head was found.

Δ: the case where the number of practically acceptable liquid jet recording heads is few, and ○: the case the production yield is within a value previously estimated based on the number of nozzles.

From the results shown in Table 9, the following facts are understood. That is, no practically acceptable liquid jet recording head can be obtained in the case of Comparative Sample No. 1'; the production yield for a practically acceptable liquid jet recording head is extremely low in the case of Comparative Sample No. 2'; and a desirable production yield is provided in the case of each of Comparative Sample No. 3' and Comparative Sample No. 4'.

Then, as for each of the comparative liquid jet recording head samples of Comparative Sample No. 1' to Comparative Sample No. 4', evaluation Was conducted with respect to discharging durability, and printing precision and appearance of uneven density in terms of printing performance in the same manner as in Example 2. As a result, each of the practically acceptable liquid jet recording head samples of Comparative Sample No. 2' to Comparative Sample No. 4' was found to be fitness with regard to each of the evaluation items of discharging durability, and printing precision and appearance of uneven density in terms of printing performance.

Comparative Example 3

(preparation of a liquid jet recording head using a single crystal silicon substrate)

In this comparative example, two liquid jet recording head samples of Comparative Sample No. 4' shown in Table 9 were integrated to obtain a liquid jet recording head unit wit 8576 discharging outlets (Comparative Example No. 4", see Table 10).

The head unit was prepared in the following manner. That is, one of the liquid jet recording head samples was was fixed to a face of an aluminum support member, and the remaining liquid jet recording head sample was arranged on and fixed to the other face of the support member such that the discharging outlets of the two liquid jet recording heads were arranged to correspond to each other precisely as much as possible along the entire length of the liquid jet recording head unit.

The resultant liquid jet recording head unit was evaluated with respect to discharging durability, and printing precision and appearance of uneven density in terms of printing performance in the same manner as in Example 2. As a result, it was found to be fitness with respect to durability. But it was found to be unfitness with respect to printing precision. The reason for this was found to be due to the influence based an error in the assembly of the two heads. Further, as for the evaluation with respect to appearance of uneven density, it was found to be unfitness. The reason for this was found to be due to a difference in the Vth (discharging threshold voltage) among the two heads.

The results obtained are collectively shown in Table 10.

TABLE 1

| Sample No. | Si-base member | the presence or absence of alkali at the time of primary polishing | surface roughness $R_{max}$ (Å) | step at grain boundary |
|---|---|---|---|---|
| 1 | single crystal | present | 150 | — |
| 2 | single crystal | absent | 150 | — |
| 3 | polycrystalline | present | 150 | occurred (maximum 0.2 μm) |
| 4 | polycryastalline | absent | 150 | none |

TABLE 2

| Sample | base member size | maximum warp magnitude in terms of relative value | |
|---|---|---|---|
| No | (mm) | single crystal Si | polycrystalline Si |
| 1 | 800 × 150 × 1.1 | 3 | 1 |
| 2 | 700 × 150 × 1.1 | 2.5 | 1 |
| 3 | 600 × 150 × 1.1 | 2 | 1 |
| 4 | 500 × 150 × 1.1 | 1.2 | 1 |
| 5 | 400 × 150 × 1.1 | 1 | 1 |
| 6 | 300 × 150 × 1.1 | 1 | 1 |

TABLE 3

| Sample No. | crystallinity | mean crystal grain size (mm) | fitness proportion in terms of relative value |
|---|---|---|---|
| 1 | Si single crystal | — | 0.4 |
| 2 | Si polycrystalline | 15 | 0.45 |
| 3 | Si polycrystalline | 8 | 0.8 |
| 4 | Si polycrystalline | 5 | 0.9 |
| 5 | Si polycrystalline | 2 | 1 |
| 6 | Si polycrystalline | 1 | 1 |
| 7 | Si polycrystalline | 0.1 | 1 |
| 8 | Si polycrystalline | 0.01 | 1 |

TABLE 4

| Sample No. | Si-base member used | pit number (number/$cm^2$) | yield (%) |
|---|---|---|---|
| 1 | single crystal | 1 | 95 |
| 2 | polycrystalline silicon with no addition of release agent | 1 | 95 |
| 3 | polycrystalline silicon with addition of release agent | 5 | 95 |
| 4 | same as in sample 3 | 10 | 90 |
| 5 | same as in sample 3 | 50 | 60 |
| 6 | same as in sample 3 | 100 | 30 |

TABLE 5

| sample No | diffusion preventive layer thickness (μm) | thermal oxide layer thickness (μm) | surface state after the thermal oxidation | survival rate of the heat generating resistor $1 \times 10^7$ | $1 \times 10^8$ | $3 \times 10^8$ |
|---|---|---|---|---|---|---|
| 1 | none | 3 | steps with about 0.1 μm occured | 50% | 10% | 0% |
| 2 | 0.004 | 3 | steps with about 0.1 μm occured | — | — | — |
| 3 | 0.04 | 2.9 | no substantial difference in comparison with that | 100% | 100% | 100% |
| | | | before the thermal oxidation | 100% | 100% | 100% |
| 4 | 0.1 | 2.8 | same as in sample 3 | 100% | 100% | 100% |
| 5 | 1 | 2 | same as in sample 3 | 100% | 100% | 100% |
| 6 | 10 | 1 | same as in sample 3 | 100% | 100% | 100% |
| 7 | 20 | 0.5 | same as in sample 3 | 100% | 100% | 100% |
| 8 | 50 | 0.3 | same as in sample 3 | 100% | 100% | 100% |

TABLE 6

| Sample No. | crystallinity | base member size (mm) | presence of absence of a step at the heat accumulating layer surface | exposure fitness proprotion |
|---|---|---|---|---|
| 1 | Si polycrystalline | 600 × 150 × 1.1 | none | 100% |
| 2 | Si polycrystalline | 500 × 150 × 1.1 | none | 100% |
| 3 | Si polycrystalline | 400 × 150 × 1.1 | none | 100% |
| 4 | Si polycrystalline | 300 × 150 × 1.1 | none | 100% |

TABLE 7

| Sample No. | crystallinity | base member size (mm) | number of discharging outlet | yield upon producing a recording head | survival rate of the heat generating resistor $1 \times 10^7$ | $1 \times 10^8$ | $3 \times 10^8$ | printing width (mm) | printing function printing precision | appearance of uneven density |
|---|---|---|---|---|---|---|---|---|---|---|
| 1' | Si polycrystalline | 600 × 150 × 1.1 | 8576 | o | 100% | 100% | 100% | 545 | fitness | fitness |
| 2' | Si polycrystalline | 500 × 150 × 1.1 | 7244 | o | 100% | 100% | 100% | 460 | fitness | fitness |
| 3' | Si polycrystalline | 400 × 150 × 1.1 | 5504 | o | 100% | 100% | 100% | 350 | fitness | fitness |
| 4' | Si polycrystalline | 300 × 150 × 1.1 | 4288 | o | 100% | 100% | 100% | 272 | fitness | fitness |

TABLE 8

| Sample No. | crystallinity | base member size (mm) | exposure fitness proportion |
|---|---|---|---|
| 1 | Si single crystal | 600 × 150 × 1.1 | 40% |
| 2 | Si single crystal | 500 × 150 × 1.1 | 90% |

TABLE 8-continued

| Sample No. | crystallinity | base member size (mm) | exposure fitness proportion |
|---|---|---|---|
| 3 | Si single crystal | 400 × 150 × 1.1 | 100% |
| 4 | Si single crystal | 300 × 150 × 1.1 | 100% |

TABLE 9

| Sample No. | crystallinity | base member size (mm) | number of discharging outlet | yield upon producing a recording head | survival rate of the heat generating resistor $1 \times 10^7$ | $1 \times 10^8$ | $3 \times 10^8$ | printing width (mm) | printing function printing precision | appearance of uneven density |
|---|---|---|---|---|---|---|---|---|---|---|
| 1' | Si single crystalline | 600 × 150 × 1.1 | — | X | — | — | — | — | — | — |
| 2' | Si single crystalline | 500 × 150 × 1.1 | 7244 | Δ | 100% | 100% | 100% | 460 | fitness | fitness |

TABLE 9-continued

| Sample No. | crystallinity | base member size (mm) | number of discharging outlet | yield upon producing a recording head | survival rate of the heat generating resistor $1 \times 10^7$ | $1 \times 10^8$ | $3 \times 10^8$ | printing width (mm) | printing function printing precision | appearance of uneven density |
|---|---|---|---|---|---|---|---|---|---|---|
| 3' | Si single crystalline | 400 × 150 × 1.1 | 5504 | o | 100% | 100% | 100% | 350 | fitness | fitness |
| 4' | Si single crystalline | 300 × 150 × 1.1 | 4288 | o | 100% | 100% | 100% | 272 | fitness | fitness |

TABLE 10

| Sample No. | crystallinity | base member size (mm) | number of discharging outlet per head unit | survival rate of the heat generating resistor $1 \times 10^7$ | $1 \times 10^8$ | $3 \times 10^8$ | printing width (mm) | printing function printing precision | appearance of uneven density |
|---|---|---|---|---|---|---|---|---|---|
| 4" | single crystal | (300 × 150 × 1.1) × 2 | 8576 | 100% | 100% | 100% | 545 | unfitness | unfitness |

Figure 1:
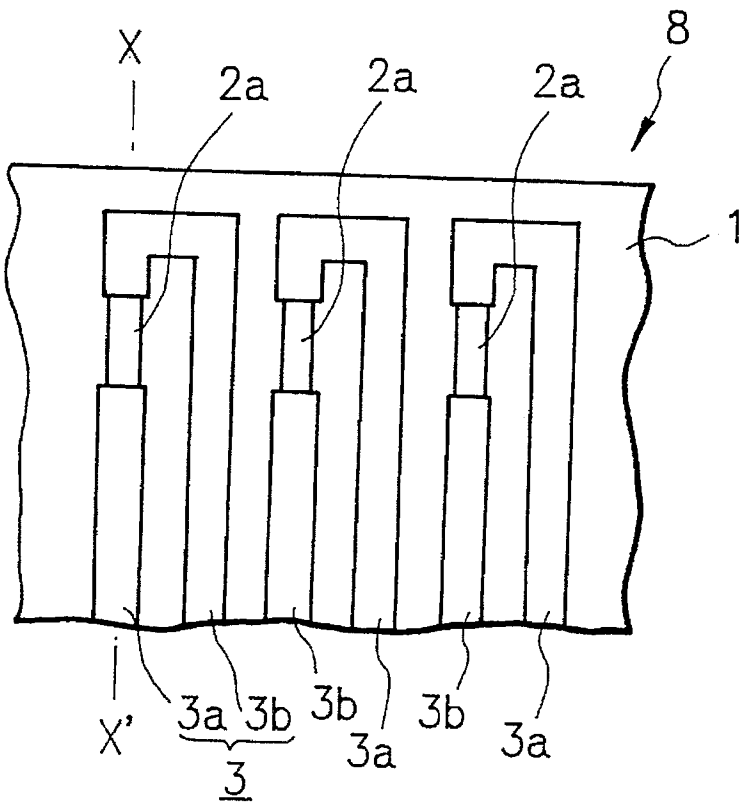
FIG. 1(A) is a schematic plan view illustrating the principal portion of an example of a substrate for liquid jet recording head according to the present invention.
FIG. 1(B) is a schematic cross-sectional view, taken along the X—Y line in FIG. 1(A).
Figure 1:
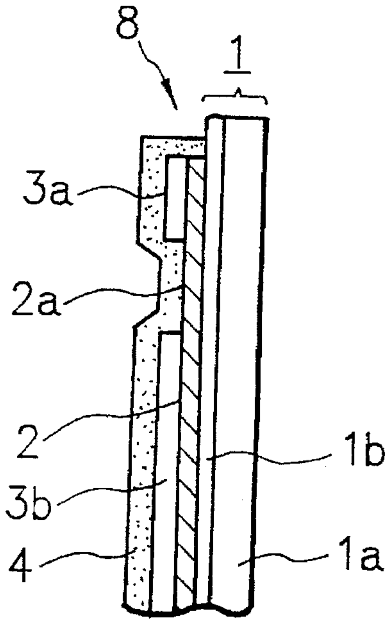
Figure 2:
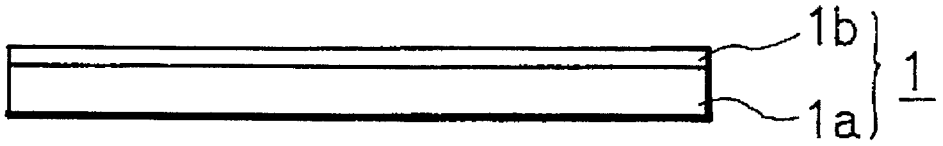
FIG. 2 is a schematic cross-sectional view illustrating an example of a base member for a substrate for liquid jet recording head according to the present invention.
Figure 3:
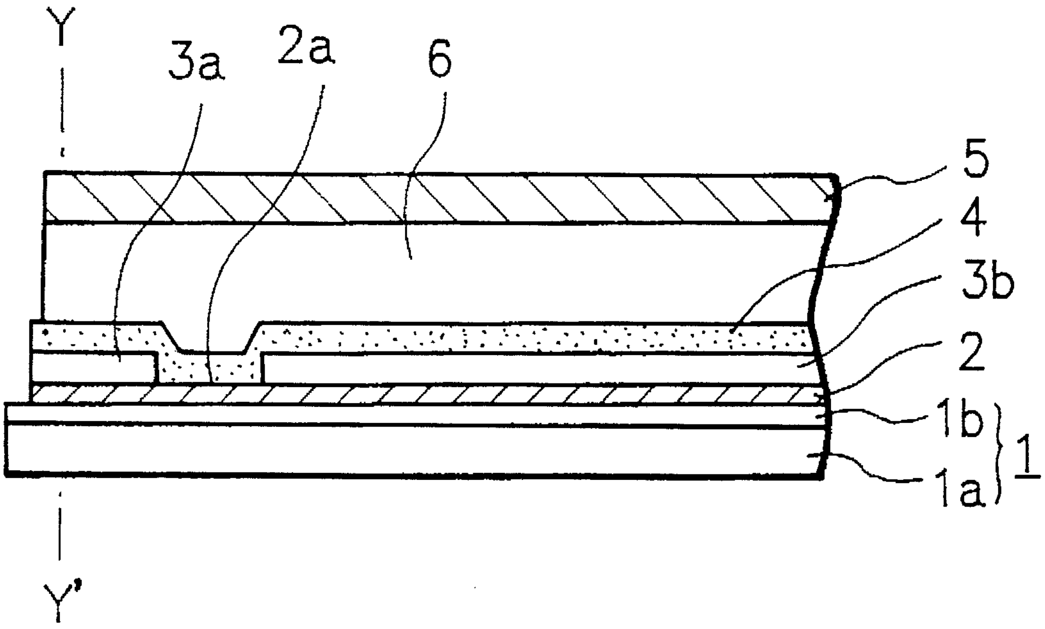
FIG. 3 is a schematic cross-sectional view for explaining the manufacturing process of producing a liquid jet recording head in the present invention.
Figure 4:
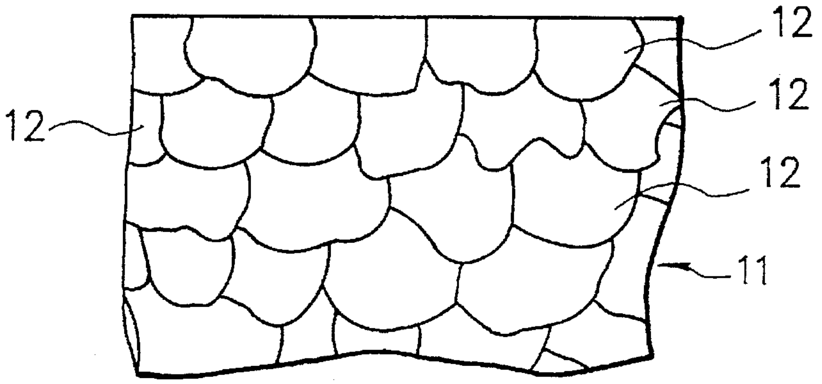
FIGS. 4(A) through 4(C) are schematic explanatory view for the steps of forming a thermal oxide layer on the surface of a polycrystalline silicon base member in the present invention.
Figure 4:
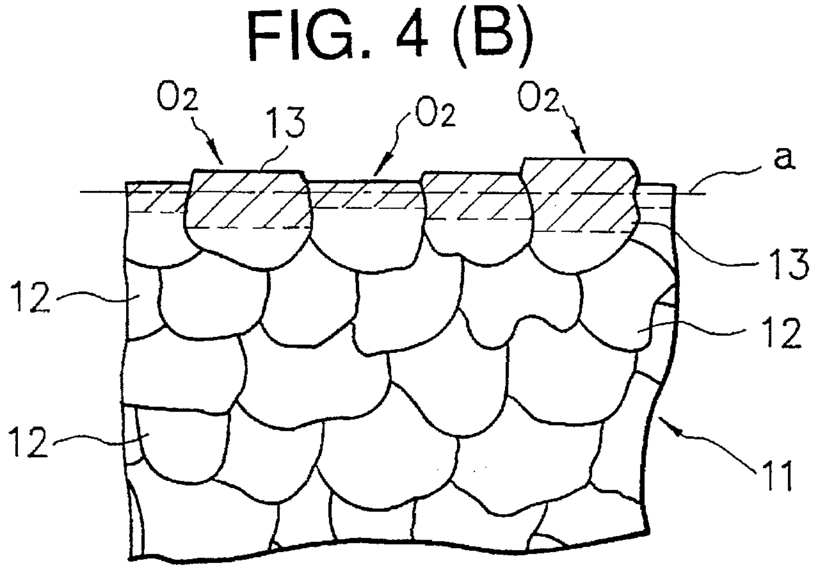
Figure 4:
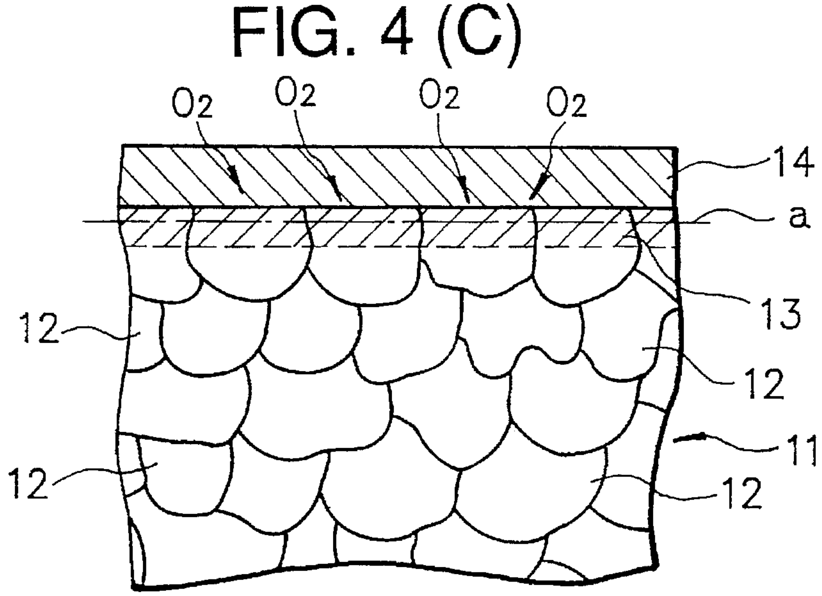
Figure 5:
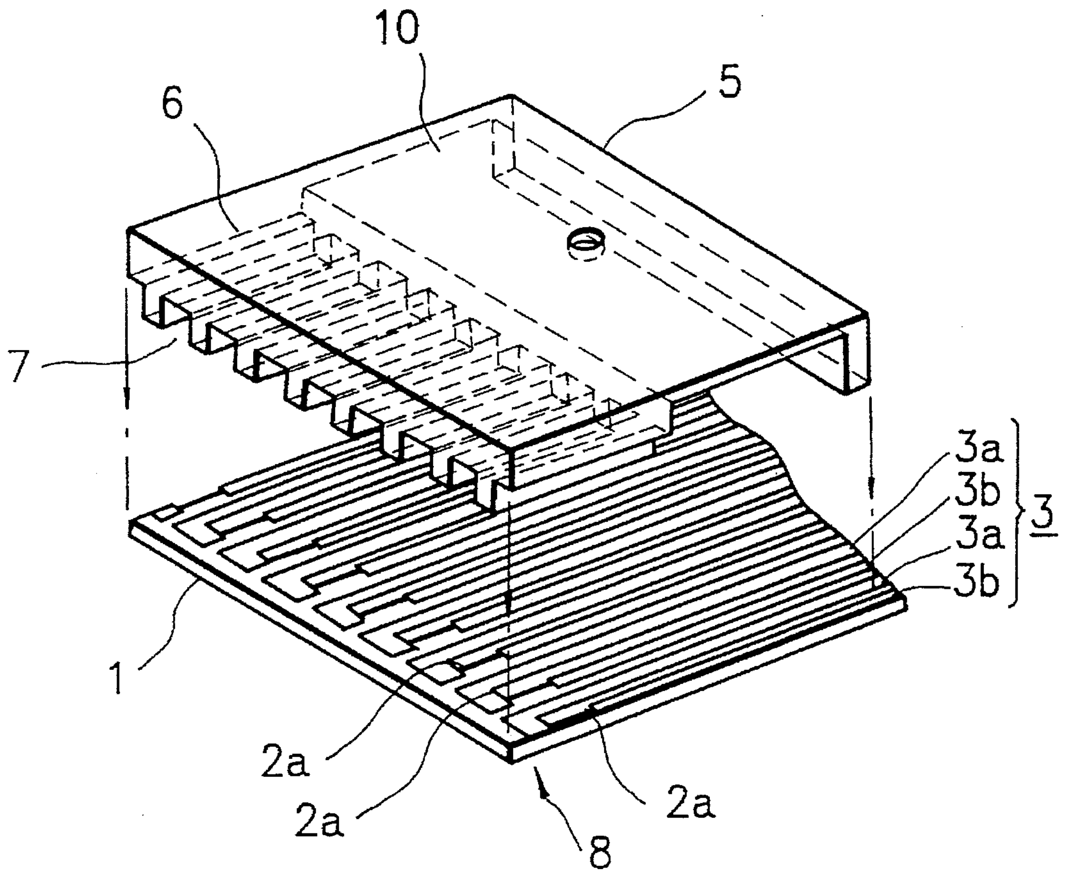
FIG. 5(A) is a schematic cross-eyed view illustrating the principal part of an example of a liquid jet recording head.
FIG. 5(B) is a schematic cross-sectional view, taken along the liquid pathway and at the face perpendicular to the substrate of the above recording head.
Figure 5:
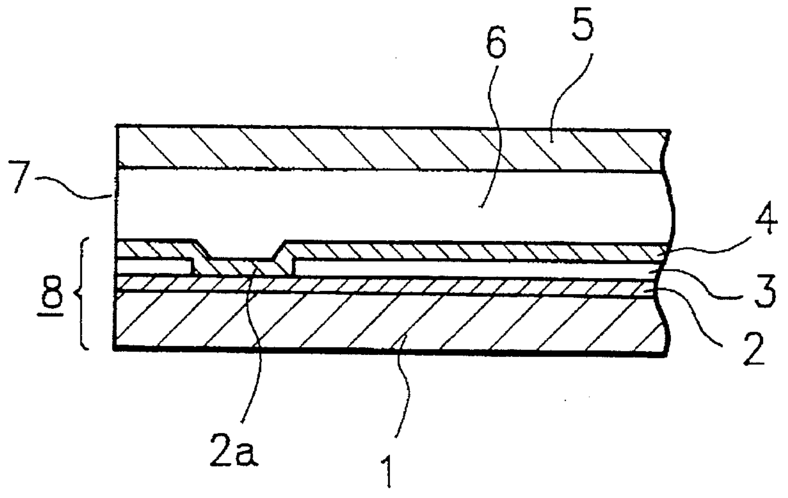
Figure 6:
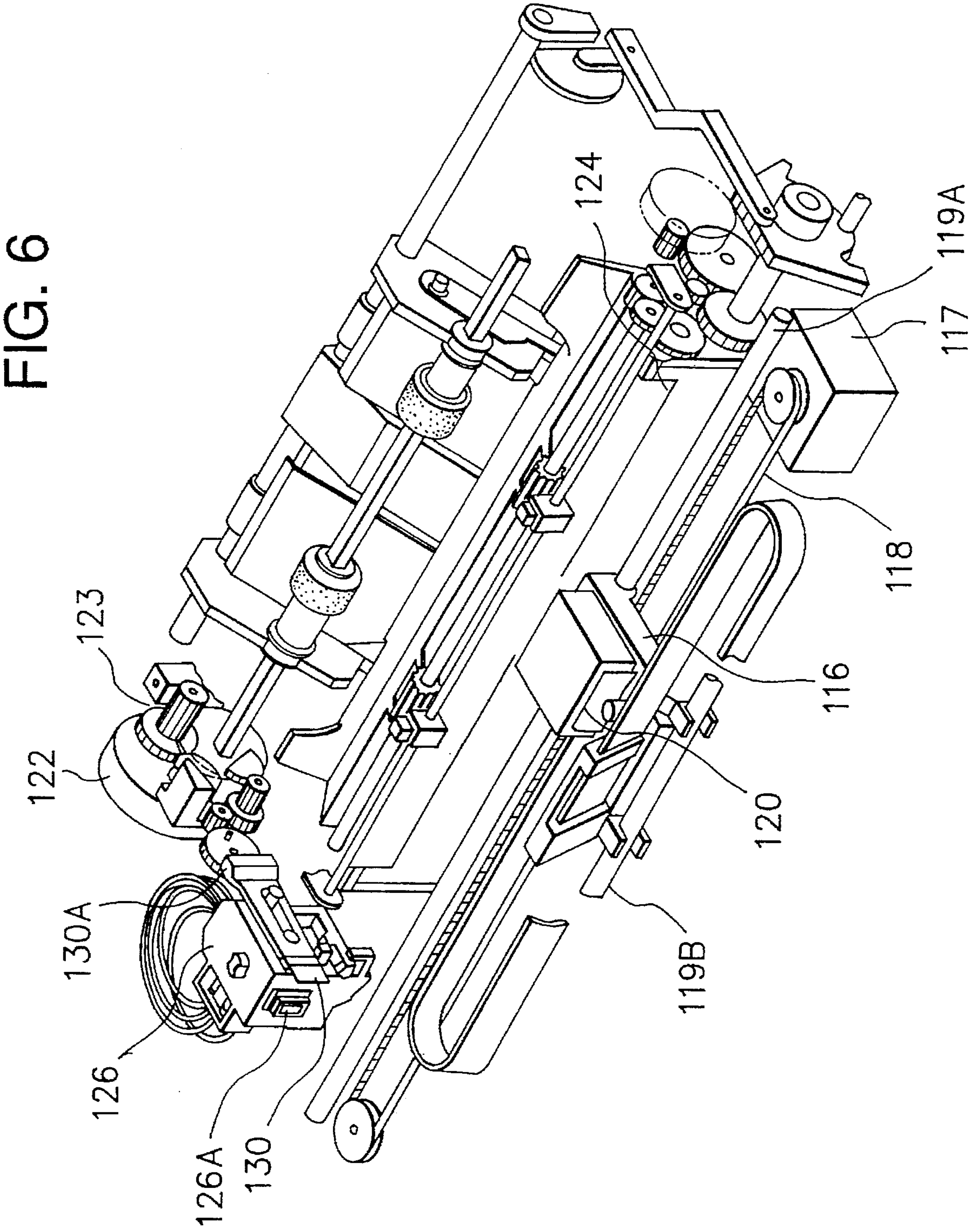
FIG. 6 is a schematic view illustrating an embodiment of a recording apparatus provided with a liquid jet recording head according to the present invention.
Figure 7:
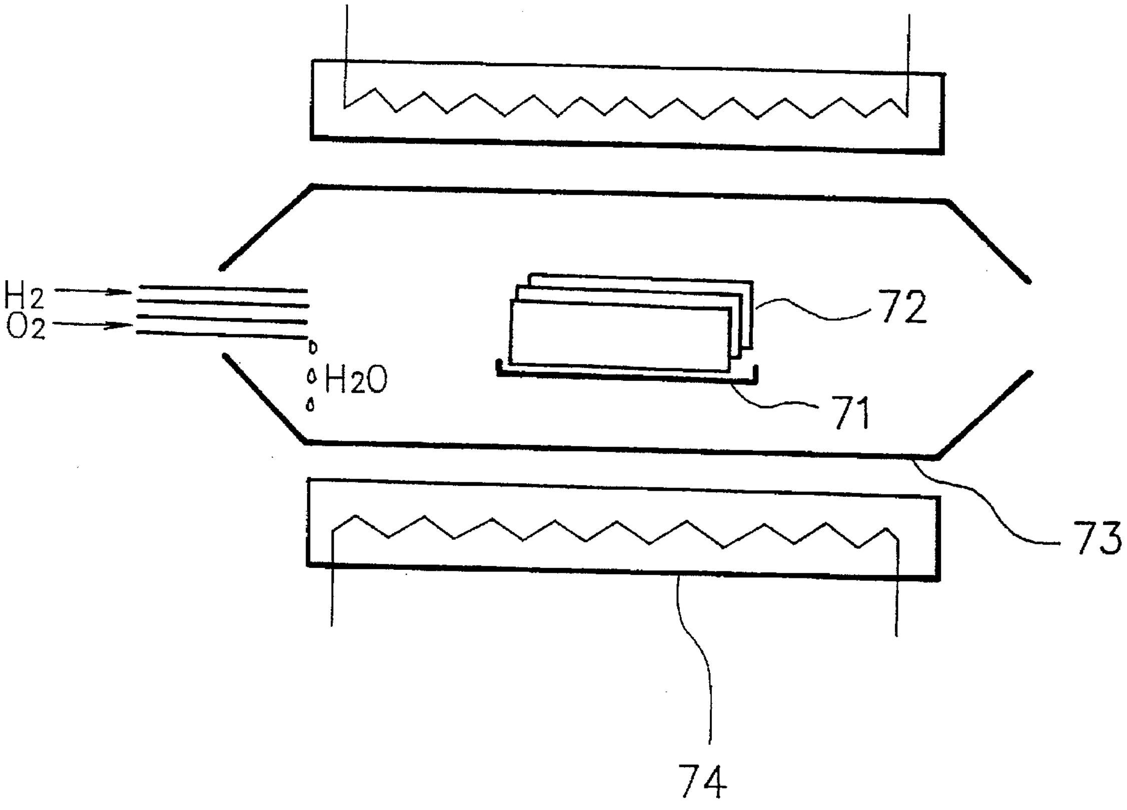
FIG. 7 is a schematic explanatory view of an example of a thermal oxidation apparatus used for thermally oxidizing the surface of a base member for a substrate for liquid jet recording head in the present invention.
Figure 8:
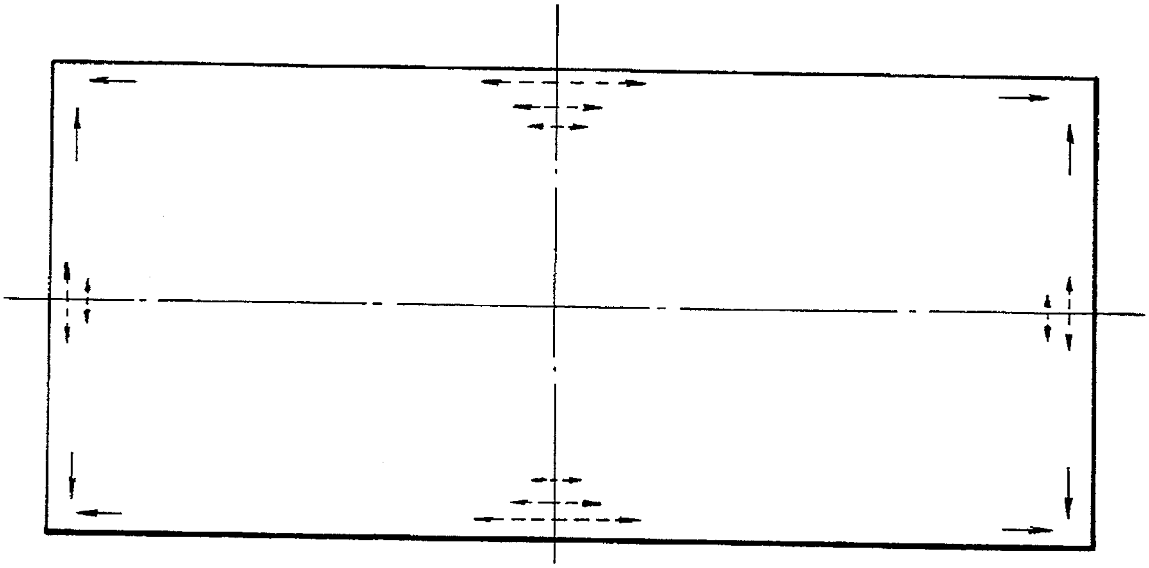
FIGS. 8(A) and 8(B) are schematic views for explaining the mechanism of causing a bowed portion at a base member.
Figure 8:
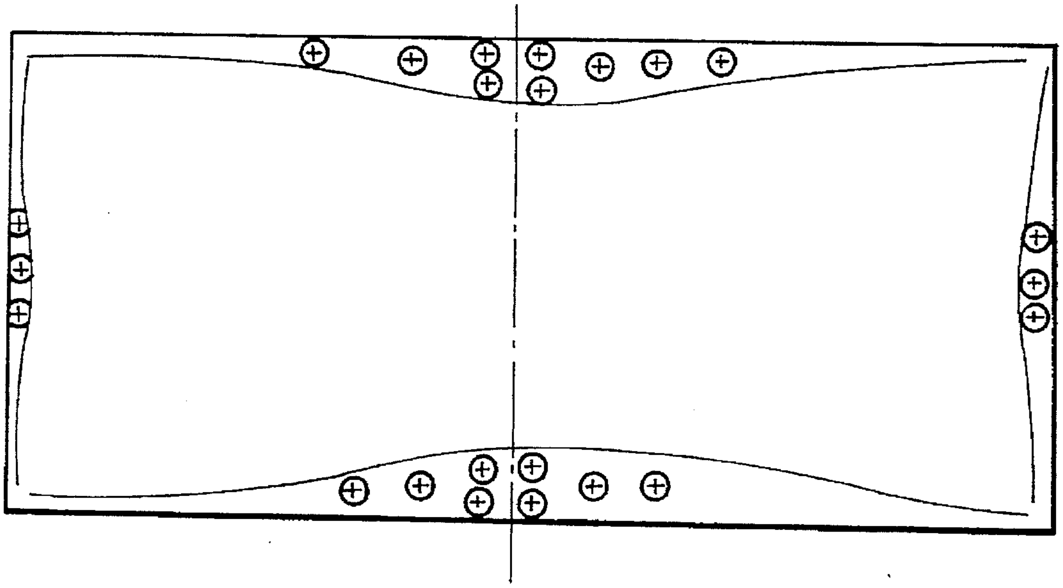
Figure 9:
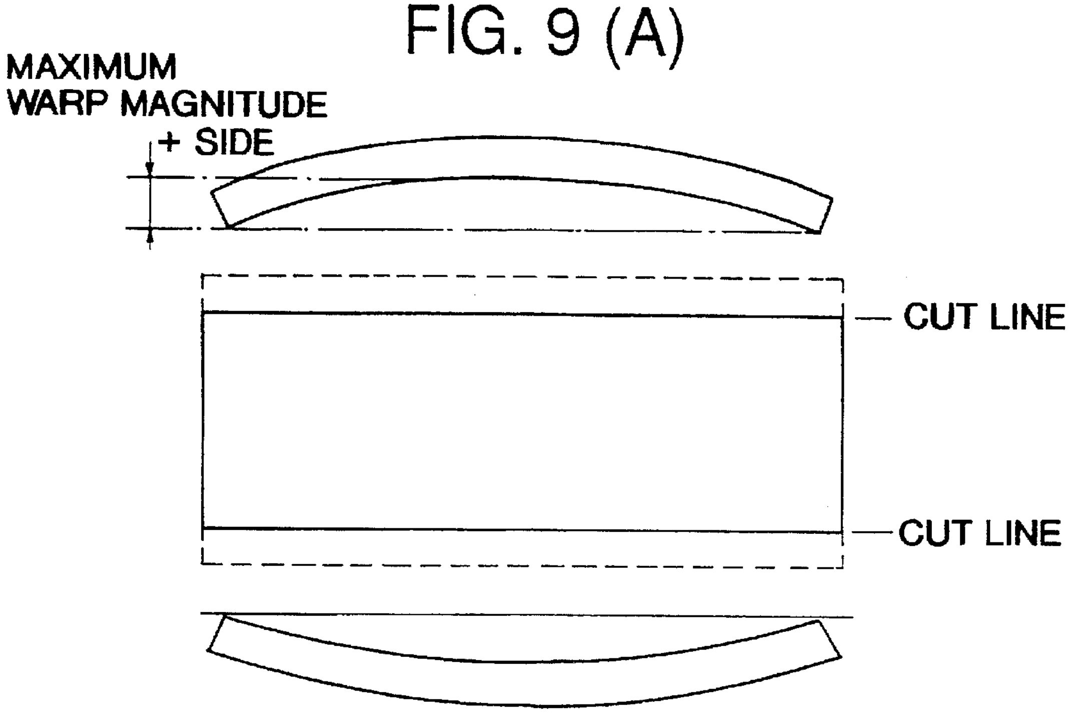
FIGS. 9(A) through 9(C) are schematic views for explaining the situation of causing a bowed portion at the time of cutting a base member.
FIG. 9(D) is a schematic explanatory view of the manner of measuring the magnitude of a bowed portion occurred at a base member.
Figure 9:
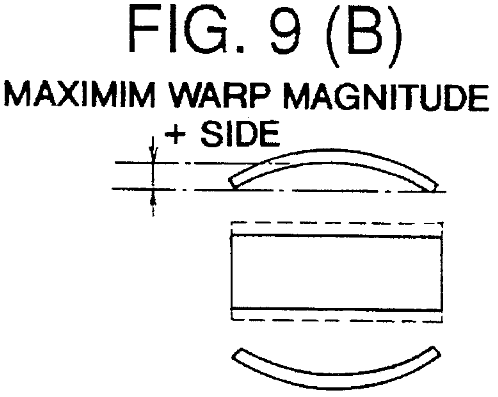
Figure 9:
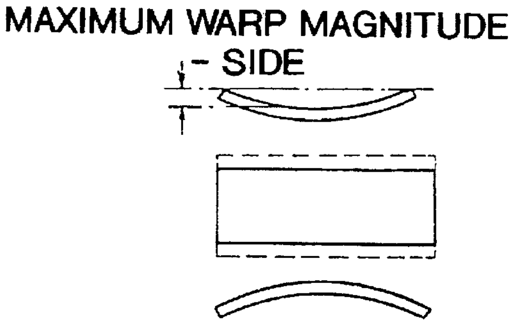
Figure 9:
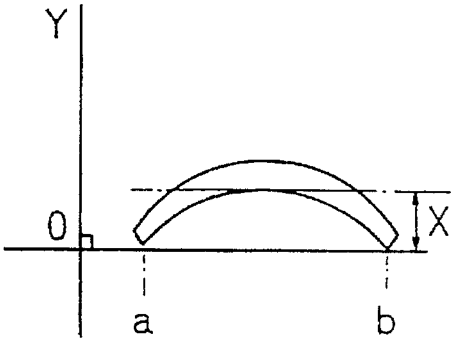

I claim:

1. A process for producing a substrate for a liquid jet recording head having an electrothermal converting body comprising a heat generating resistor for generating thermal energy and a pair of wirings electrically connected to said heat generating resistor formed on a base member, said process comprising the steps of:

(a) providing a base member constituted by a non-amorphous polycrystalline material, (b) forming a barrier layer comprising an inorganic oxide for controlling the diffusion speed of oxygen gas on a surface of said polycrystalline base member, and (c) thermally oxidizing the surface of said polycrystalline base member through said barrier layer to form a thermal oxide layer on said polycrystalline base member.

2. A process for producing a substrate for a liquid jet recording head according to claim 1, wherein the base member is a polycrystalline silicon base member.

3. The process according to claim 1 further comprising a step of removing the barrier layer after the formation of the thermal oxide layer.

4. The process according to claim 1, wherein the inorganic oxide is titanium oxide, cobalt oxide, or silicon oxide.

5. The process according to claim 1, wherein in step (c), the polycrystalline base member is heated at a temperature of 1000° C. or more.

6. The process according to claim 1, wherein the barrier layer has a thickness of 0.04 to 10 μm.

7. A substrate for a liquid jet recording head including an electrothermal converting body comprising a heat generating resistor for generating thermal energy and a pair of wirings electrically connected to said heat generating resistor formed on a base member, which is formed by (a) providing a base member constituted by a non-amorphous polycrystalline material, (b) forming a barrier layer comprising an inorganic oxide for controlling the diffusion speed of oxygen gas on a surface of said polycrystalline base member, and (c) thermally oxidizing the surface of said polycrystalline base member through said barrier layer to form a thermal oxide layer on said polycrystalline base member.

8. A substrate according to claim 7, wherein the barrier layer is removed after the formation of the thermal oxide layer.

9. A substrate according to claim 7, wherein the inorganic oxide is titanium oxide, cobalt oxide, or silicon oxide.

10. A substrate according to claim 7, wherein in step (c), the polycrystalline base member is heated at a temperature of 1000° C. or more.

11. A substrate according to claim 7, wherein the barrier layer has a thickness of 0.04 to 10 μm.

12. A liquid jet recording head including a liquid discharging outlet; a substrate for the liquid jet recording head including an electrothermal converting body comprising a heat generating resistor for generating thermal energy for discharging liquid from said discharging outlet, a pair of wirings electrically connected to said heat generating resistor so that said pair of wirings supply an electric signal for generating said thermal energy to said heat generating resistor; and a liquid supplying pathway aligned with said electrothermal converting body of said substrate, wherein said substrate comprises a substrate for a liquid jet head formed by (a) providing a base member constituted by a non-amorphous polycrystalline material, (b) forming a barrier layer comprising an inorganic oxide for controlling the diffusion speed of oxygen gas on a surface of said polycrystalline base member, and (c) thermally oxidizing the surface of said polycrystalline base member through said barrier layer to form a thermal oxide layer on said polycrystalline base member.

13. A liquid jet recording head according to claim 12, wherein the barrier layer is removed after the formation of the thermal oxide layer.

14. A liquid jet recording head according to claim 12, wherein the inorganic oxide is titanium oxide, cobalt oxide, or silicon oxide.

15. A liquid jet recording head according to claim 12, wherein in step (c), the polycrystalline base member is heated at a temperature of 1000° C. or more.

16. A liquid jet recording head according to claim 12, wherein the barrier layer has a thickness of 0.04 to 10 μm.

17. A liquid jet recording apparatus comprising:

a liquid jet recording head including a liquid discharging outlet;

a substrate for the liquid jet recording head including an electrothermal converting body comprising a heat generating resistor for generating thermal energy for discharging liquid from said discharging outlet, a pair of wirings electrically connected to said heat generating resistor so that said pair of wirings supply an electric signal for generating said thermal energy to said heat generating resistor;

and a liquid supplying pathway aligned with said electrothermal converting body of said substrate; and an electric signal supplying means for supplying an electric signal to said heat generating resistor of said recording head, wherein said substrate comprises a substrate for a liquid jet head formed by (a) providing a base member constituted by a non-amorphous polycrystalline material, (b) forming a barrier layer comprising an inorganic oxide for controlling the diffusion speed of oxygen gas on a surface of said polycrystalline base member, and (c) thermally oxidizing the surface of said polycrystalline base member through said barrier layer to form a thermal oxide layer on said polycrystalline base member.

18. A liquid jet recording apparatus according to claim 17, wherein the barrier layer is removed after the formation of the thermal oxide layer.

19. A liquid jet recording head according to claim 17, wherein the inorganic oxide is titanium oxide, cobalt oxide, or silicon oxide.

20. A liquid jet recording apparatus according to claim 17, wherein in step (c), the polycrystalline base member is heated at a temperature of 1000° C. or more.

21. A liquid jet recording apparatus according to claim 14, wherein the barrier layer has a thickness of 0.04 to 10 μm.

* * * * *

UNITED STATES PATENT AND TRADEMARK OFFICE

CERTIFICATE OF CORRECTION

PATENT NO. : 5,661,503 Page 1 of 7

DATED : August 26, 1997

INVENTOR(S) : HARUHIKO TERAI

It is certified that error appears in the above-identified patent and that said Letters Patent is hereby corrected as shown below:

COLUMN 1:

Line 53, "one" should read --to one--.

COLUMN 2:

Line 55, "whereby" should read --thereby--.

COLUMN 3:

Line 29, "use" should read --use of--.

COLUMN 4:

Line 17, "pattering" should read --patterning--.
Line 26, "dustortion" should read --distortion--.
Line 37, "memmber" should read --member--.

COLUMN 5:

Line 37, "The" should read --the--.

COLUMN 6:

Line 8, "have" should read --has--.
Line 28, "is" should read --, which is--.

COLUMN 7:

Line 34, "The" should read --the--.

UNITED STATES PATENT AND TRADEMARK OFFICE

CERTIFICATE OF CORRECTION

PATENT NO. : 5,661,503 Page 2 of 7

DATED : August 26, 1997

INVENTOR(S) : HARUHIKO TERAI

It is certified that error appears in the above-identified patent and that said Letters Patent is hereby corrected as shown below:

COLUMN 8:

Line 23, "whereby" should read --thereby--.
Line 39, "whereby" should read --thereby--.

COLUMN 9:

Line 25, "whereby" should read --thereby--.

COLUMN 10:

Line 3, "whereby" should read --thereby--.
Line 21, "later" should read --layer--.
Line 43, "followings" should read --following--.

COLUMN 11:

Line 55, "made to be unfitness" should read --considered to be unfit--.

COLUMN 12:

Line 6, "member" (first occurrence) should be deleted.
Line 32, "An" should be deleted.
Line 33, "when" should read --When--.

UNITED STATES PATENT AND TRADEMARK OFFICE

CERTIFICATE OF CORRECTION

PATENT NO. : 5,661,503

DATED : August 26, 1997

INVENTOR(S) : HARUHIKO TERAI

It is certified that error appears in the above-identified patent and that said Letters Patent is hereby corrected as shown below:

COLUMN 13:

Line 58, "20 this patterns" should read --Twenty of these patterns--.

COLUMN 14:

Line 9, "therms" should read --terms--.
Line 14, "therms" should read --terms--.
Line 17, "therms" should read --terms--.
Line 20, "therms" should read --terms--.
Line 24, "therms" should read --terms--.
Line 32, "therms" should read --terms--.

COLUMN 15:

Line 17, "later" should read --layer--.

COLUMN 17:

Line 47, "resistor" should read --resistors--.
Line 49, "Pal" should read --Pel--.
Line 51, "one" should read --to one--.

COLUMN 18:

Line 33, "on" should read --no--.

UNITED STATES PATENT AND TRADEMARK OFFICE
CERTIFICATE OF CORRECTION

PATENT NO. : 5,661,503

DATED : August 26, 1997

INVENTOR(S) : HARUHIKO TERAI

It is certified that error appears in the above-identified patent and that said Letters Patent is hereby corrected as shown below:

COLUMN 19:

Line 23, "40$\mu$" should read --40 Å--.

COLUMN 20:

Line 10, "memer" should read --member--.

COLUMN 21:

Line 7, "if a" should read --if an--.
Line 9, "to a" should read --to an--.
Line 41, "let" should read --jet--.
Line 45, "let" should read --jet--.

COLUMN 22:

Line 2, "capable" should read --capable of--.
Line 26, "Secondary," should read --Secondly,--.

COLUMN 23:

Line 21, "a" should read --an--.
Line 63, "later" should read --layer--.

COLUMN 24:

Line 20, "a" should read --an--.
Line 40, "amounted" should read --mounted--.

UNITED STATES PATENT AND TRADEMARK OFFICE
CERTIFICATE OF CORRECTION

PATENT NO. : 5,661,503

DATED : August 26, 1997

INVENTOR(S) : HARUHIKO TERAI

It is certified that error appears in the above-identified patent and that said Letters Patent is hereby corrected as shown below:

COLUMN 25:

Line 4, "so-cally" should read --so-called--.
Line 20, "whereby" should read --thereby--.
Line 27, "whereby" should read --thereby--.

COLUMN 26:

Line 5, "or far" should read --or for--.
Line 11, "trough" should read --through--.

COLUMN 27:

Line 33, "stating" should read --starting--.

COLUMN 28:

Line 8, "its" should read --to its--.
Line 51, "one" should read --to one--.

COLUMN 29:

Line 1, "patten" should read --pattern--.

COLUMN 30:

Line 7, "cause" should read --caused--.

UNITED STATES PATENT AND TRADEMARK OFFICE

CERTIFICATE OF CORRECTION

PATENT NO. : 5,661,503

DATED : August 26, 1997

INVENTOR(S) : HARUHIKO TERAI

It is certified that error appears in the above-identified patent and that said Letters Patent is hereby corrected as shown below:

COLUMN 32:

Line 1, "case" should read --case where--.
Line 17, "Was" should read --was--.
Line 41, "wit" should read --with--.
Line 46, "was" (second occurrence) should be deleted.
Line 63, "an" should read --on an--.

COLUMN 33:

Line 12, "polycryastalline" should read --polycrystalline--.

COLUMN 35:

Line 8, "occured" should read --occurred--.
Line 10, "occured" should read --occurred--.
Line 23, "presence of" should read --presence or--.
Line 40, "outlet" should read --outlets--.
Line 62, "outlet" should read --outlets--.

COLUMN 37:

Line 8, "outlet" should read --outlets--.
Line 20, "outlet" should read --outlets--.
Line 38, "view" should read --views--.
Line 43, "cross-eyed" should read --perspective--.

UNITED STATES PATENT AND TRADEMARK OFFICE

CERTIFICATE OF CORRECTION

PATENT NO. : 5,661,503 Page 7 of 7

DATED : August 26, 1997

INVENTOR(S) : HARUHIKO TERAI

It is certified that error appears in the above-identified patent and that said Letters Patent is hereby corrected as shown below:

COLUMN 39:

Line 12, "supply" should read --supplies--.

COLUMN 40:

Line 6, "supply" should read --supplies--.
Line 36, "claim 14," should read --claim 17,--.

Signed and Sealed this

Eleventh Day of August 1998

Bruce Lehman

Attest:

BRUCE LEHMAN

*Attesting Officer*

*Commissioner of Patents and Trademarks*